US012656955B2

(12) United States Patent
Ostapenko et al.

(10) Patent No.: US 12,656,955 B2
(45) Date of Patent: Jun. 16, 2026

(54) APPARATUS AND METHOD FOR DYNAMICALLY RECONFIGURING MEMORY REGION OF MEMORY DEVICE

(71) Applicant: SAMSUNG ELECTRONICS CO., LTD., Suwon-si (KR)

(72) Inventors: Maksim Ostapenko, Suwon-si (KR); Youngsam Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 199 days.

(21) Appl. No.: 18/327,323

(22) Filed: Jun. 1, 2023

(65) Prior Publication Data
US 2024/0152278 A1 May 9, 2024

(30) Foreign Application Priority Data
Nov. 3, 2022 (KR) ........................ 10-2022-0145055

(51) Int. Cl.
*G06F 3/00* (2006.01)
*G06F 3/06* (2006.01)

(52) U.S. Cl.
CPC .......... *G06F 3/0613* (2013.01); *G06F 3/0631* (2013.01); *G06F 3/0673* (2013.01); *G06F 3/0656* (2013.01)

(58) Field of Classification Search
None
See application file for complete search history.

(56) References Cited

U.S. PATENT DOCUMENTS

| | | | |
|---|---|---|---|
| 6,402,795 | B1 | 6/2002 | Chu et al. |
| 6,485,622 | B1 | 11/2002 | Fu |
| 7,901,658 | B2 | 3/2011 | Weppner et al. |
| 8,828,580 | B2 | 9/2014 | Visco et al. |
| 2014/0089626 | A1 | 3/2014 | Schluessler et al. |

(Continued)

FOREIGN PATENT DOCUMENTS

| | | | | |
|---|---|---|---|---|
| CN | 113535076 A | * | 10/2021 | ........... G06F 3/0604 |
| JP | 2010170411 A | * | 8/2010 | ........... G06F 3/0605 |

(Continued)

OTHER PUBLICATIONS

Xuan, et al., "Dynamic Management of In-memory Storage for Efficiently Integrating Compute- and Data-intensive Computing on HPC Syst558.ems", 2017 17th IEEE/ ACM International Symposium on Cluster, Cloud and Grid Computing, pp. 549-558.

(Continued)

*Primary Examiner* — Midys Rojas
(74) *Attorney, Agent, or Firm* — F. CHAU & ASSOCIATES, LLC

(57) ABSTRACT
An electronic device comprises a host processor comprising a memory controller connected to a memory device comprising a near memory processing unit. The host processor is configured to detect a system memory shortage for an operation of an operating system (OS), configure a memory region of the memory device for use in a memory pool of the OS in response to the system memory shortage, identify a request to execute an acceleration logic, and configure the memory region of the memory device for direct access by the near memory processing unit in response to the request to execute the acceleration logic.

22 Claims, 15 Drawing Sheets

(56) References Cited

U.S. PATENT DOCUMENTS

| | | | |
|---|---|---|---|
| 2018/0006326 A1 | 1/2018 | Oneill et al. | |
| 2021/0089445 A1 | 3/2021 | Wang et al. | |
| 2021/0255956 A1 | 8/2021 | Kuyel | |
| 2022/0171742 A1* | 6/2022 | Noh ........................ | G06F 16/18 |
| 2025/0267192 A1* | 8/2025 | Morano .............. | H04L 67/1097 |

FOREIGN PATENT DOCUMENTS

| | | |
|---|---|---|
| KR | 10-2272839 | 7/2021 |
| KR | 10-2334511 | 12/2021 |
| KR | 10-2022-0077684 A | 6/2022 |
| WO | 2019135319 | 1/2021 |
| WO | 2021174225 | 9/2021 |

OTHER PUBLICATIONS

Cho, et al., "Near Data Acceleration with Concurrent Host Access", 2020 ACM/IEEE 47th Annual International Symposium on Computer Architecture (ISCA), pp. 818-831.
KR 1st Office Action dated Jul. 3, 2025 issued in corresponding corresponding KR patent Application No. 10-2022-0145055.

* cited by examiner

100

Start

1610

Configure a memory region of a memory device for direct access by a near memory processing unit

1620

Detect a system memory shortage for an operation of an operating system (OS)

1630

Configure the memory region for use in a memory pool of the OS based on the system memory shortage during a continuous operation of the memory device End

APPARATUS AND METHOD FOR DYNAMICALLY RECONFIGURING MEMORY REGION OF MEMORY DEVICE

CROSS-REFERENCE TO RELATED APPLICATION

This application claims priority under 35 U.S.C. § 119 to Korean Patent Application No. 10-2022-0145055, filed on Nov. 3, 2022, in the Korean Intellectual Property Office, the disclosure of which is incorporated by reference herein in its entirety.

BACKGROUND

The following disclosure relates generally to a memory device, and more specifically to dynamically reconfiguring a memory region of a memory device.

Efficient and high-performance neural network processing is important in devices such as computers, smartphones, tablets, or wearable devices. Some devices implement special hardware accelerators to perform specialized tasks, to increase processing performance, or to reduce power consumption. For example, hardware accelerators can be used for imaging and computer vision applications. In some cases, near-memory accelerators may be located near a memory to improve the performance of a memory device.

SUMMARY

According to embodiments of the present disclosure, an electronic device comprises a host processor comprising a memory controller connected to a memory device comprising a near memory processing unit. The host processor is configured to detect a system memory shortage for an operation of an operating system (OS), configure a memory region of the memory device for use in a memory pool of the OS in response to the system memory shortage, identify a request to execute an acceleration logic, and configure the memory region of the memory device for direct access by the near memory processing unit in response to the request to execute the acceleration logic.

The host processor may be configured to, based on a sensing of a memory rank that is unused for the acceleration logic in the memory device, add the first memory region corresponding to the detected memory rank to the memory pool.

The host processor may be configured to, when the first memory region within a memory rank being used for the acceleration logic is available, configure the first memory region to restrict access of the near memory processing unit to the first memory region, and add the first memory region to the memory pool without rebooting.

The host processor may be configured to determine that the system memory of the OS is insufficient, based on detecting an attempt by the OS to swap data of the memory pool of the OS.

The host processor may be configured to, when a memory rank in which the acceleration logic is executable is detected from among unused memory ranks, cause the near memory processing unit to execute the acceleration logic using the second memory region within the detected memory rank.

The host processor may be configured to search for at least one candidate memory region from a memory rank used in the memory pool, determine the second memory region from among the at least one candidate memory region, and cause the near memory processing unit to execute the acceleration logic using the second memory region within a detected memory rank.

The host processor may be configured to exclude the second memory region from the memory pool, and configure the second memory region to restrict access of the OS to the second memory region and allow access of the near memory processing unit to the second memory region.

The host processor may be configured to lock the second memory region, migrate data of the second memory region to another memory region, and cause the acceleration logic to be executed using the second memory region when a migration of the data is completed.

The host processor may be configured to, when a memory rank includes a system memory region and a memory region for the acceleration logic, migrate data of the system memory region to another memory rank based on a sensing of an available space in the other memory rank.

The host processor may be configured to, when a memory rank collision in which access to the system memory region occurs during an execution of the acceleration logic using the memory region of the memory rank is detected a threshold number of times or greater, monitor the available space of the other memory rank.

According to embodiments of the present disclosure, a method comprises configuring a memory region of a memory device for use in a memory pool of an operating system (OS), identifying a request to execute an acceleration logic, and configuring the memory region of the memory device for direct access by a near memory processing unit in response to the request to execute the acceleration logic during a continuous operation of the memory device.

According to embodiments of the present disclosure, a method comprising configuring a memory region of a memory device for direct access by a near memory processing unit, detecting a system memory shortage for an operation of an operating system (OS), and configuring the memory region for use in a memory pool of the OS based on the system memory shortage during a continuous operation of the memory device.

Additional aspects of embodiments will be set forth in part in the description which follows and, in part, will be apparent from the description, or may be learned by practice of the present disclosure.

BRIEF DESCRIPTION OF THE DRAWINGS

Aspects of the disclosure are described in conjunction with the accompanying drawings.

DETAILED DESCRIPTION

The present disclosure relates to computing devices, and specifically to managing memory allocation within a memory device. Computing devices can include multiple memory regions, such as memory allocated to a system memory and a memory allocated for a near-memory accelerator. For example, a system for imaging and computer vision acceleration may include a large number of special hardware accelerators with efficient streaming interconnections to transmit data between the hardware accelerators.

In some cases it is desirable to reallocate memory among different purposes, such as increasing the amount of memory allocated for system memory and decreasing the amount of memory used for acceleration, or vice versa. However, conventional devices are unable to reallocate memory among these uses, or they may require a system reboot to reallocate memory.

Embodiments of the present disclosure enable dynamic reallocation of memory (e.g., between system random access memory (RAM) a near-memory accelerator memory) without a system reboot. Thus, a system can operate continuously while changing from one allocation pattern to another allocation pattern. Accordingly, the term "continuous operation" can refer to an operation that does not depend on, or is not interrupted by, a system reboot. In some embodiments, a memory can be used in a near memory accelerator mode and in a system memory mode (e.g., a system RAM mode) simultaneously.

Figure 1:
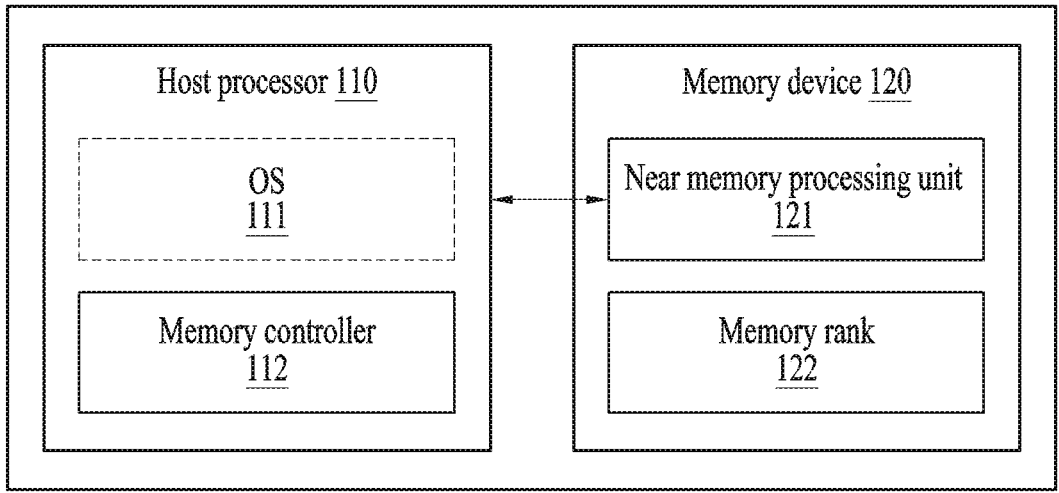
FIG. 1 is a block diagram illustrating a data processing apparatus according to one or more embodiments of the present disclosure.

FIG. 1 is a block diagram illustrating a data processing apparatus according to one or more embodiments of the present disclosure.

Referring to FIG. 1, an electronic device 100 may include a host processor 110 and a memory device 120.

A host refers to a central management component of a computer system (e.g., the electronic device 100). A host may be implemented as the host processor 110 or as a server. For example, the host processor 110 may include a host central processing unit (CPU). For example, the host processor 110 may include a memory controller 112. In some cases, the host processor 110 may further include an operation system (OS) 111 and the host processor 110 may operate the OS 111. The memory controller 112 may control the operations of the memory device 120, including read and write operations, and manage the flow of data between the memory device 120 and the host processor 110. In some cases, the host processor 110 may operate the OS 111, add a memory region of the memory device 120 to a memory pool of the OS 111 or exclude the memory region from the memory pool, using the memory controller 112. The memory region may be a region (e.g., a physical region) within a memory chip of the memory device 120, and data may be read from and written to the memory region. The memory device 120 may be a physical memory device, which may include various types of memory such as dynamic random-access memory (DRAM), static random-access memory (SRAM), and flash memory. The memory region may be included in or excluded from the memory pool of the host processor 110 for dynamic memory allocation. The memory pool may be a pool for a memory management to perform dynamic memory allocation.

The memory device 120 may include a memory region to store data. The memory device 120 may process data of the memory region in cooperation with the host processor 110. For example, the memory device 120 may process data based on a command received from the host processor 110. The memory device 120 may control the memory region in response to a command received from the host processor 110. The memory device 120 may include a near memory processing unit 121, and a memory rank 122. The memory device 120 may be separated from the host processor 110.

The near memory processing unit 121 may include a processor. The processor may process data stored in the memory region. For example, the processor of the near memory processing unit 121 may process data of a memory region, such as the memory rank 122, which is disposed near and connected to the processor. To execute the operations described herein, the processor of the near memory processing unit 121 may execute computer-readable code including software that is stored in the memory region and instructions that are triggered by the processor of the near memory processing unit 121. The desired operations may include, for example, codes or instructions included in a program such as a computer program, application program, or operating system. Hereinafter, an example of a structure in which the near memory processing unit 121 includes an accelerator unit, a controller, and a buffer will be described with reference to FIG. 2. For reference, the host processor 110 may control the overall operation of the electronic device 100 and delegate an operation that depends on an acceleration to the controller of the memory device 120.

The memory rank 122 is a set of memory chips (e.g., dynamic random-access memory (DRAM) chips) that are connected to the same chip select and simultaneously accessible as a block of a memory. The memory rank 122 may include a portion or all of memory chips of the memory device and may include the above-described memory region to store data. In an example, the memory region may be configured as a partial region or an entire region of an arbitrary memory rank 122. In some examples, the memory region may be configured as a region over multiple memory ranks 122.

The electronic device 100 may be implemented as a chip that enables a dynamic reconfiguration of memory regions and may be mounted in a mobile device and system. In addition, the electronic device 100 may be mounted in the form of a software development kit (SDK) provided along with a chip. The electronic device 100 may be applied to a data center application and high-performance computing (HPC) that utilizes memory mode reconfiguration for an efficient use of a near-memory accelerator.

The memory device 120 may operate in different modes including the system memory mode and the accelerator mode. In the system memory mode, the memory device may be configured to operate as system memory of the OS and is accessible by the OS. The system memory mode enables the memory device to function as a standard memory device.

The accelerator mode enables the near-memory accelerator to operate, providing faster data processing. The dynamic reconfiguration of memory regions refers to configurations that enables the memory device to be used for acceleration logic, which includes the execution of an acceleration operation such as a neural network operation by the accelerator unit(s). During the accelerator mode, the memory device is being used for processing tasks related to the acceleration operation rather than serving as a standard memory storage. The electronic device 100 may reconfigure the memory device 120 to switch between the system memory mode and the accelerator mode without the need for a reboot, therefore reducing service delay time and increasing server utilization rates.

In some examples, the electronic device 100 reconfigures the memory device 120 including the near-memory accelerator to operate in a system memory mode or an accelerator mode without rebooting. Since unnecessary rebooting is reduced, a service delay time may be reduced, and a server utilization rate may be increased. Existing application programs may not need to be modified in association with the dynamic reconfiguration of the memory region.

The system memory mode and the accelerator mode may be implemented separately and independently when they are within the same memory rank, resulting in more efficient memory usage. In some cases, when there are frequent memory rank collisions, a system memory may be included in another memory rank and converted to a memory rank exclusive for an accelerator. This dynamic reconfiguration of the memory region may be performed without a physical access to the server. The total system cost may be reduced by allowing the near-memory accelerator to be selectively used for each memory device, memory rank, and memory region according to workloads.

For reference, an example of the memory device 120 (e.g., an acceleration dual in-line memory module (AXDIMM), and a compute express link (CXL) memory module) including the near memory processing unit 121 is illustrated in FIG. 1, however, the embodiments of the present disclosure are not limited thereto. The host processor 110 may access another memory device 120 (e.g., a DRAM) having a memory rank 122 connected to the memory controller 112. Instructions (or programs) executable by the host processor 110 may also be stored in another memory device 120.

In embodiments of the present disclosure, the instructions may include instructions to execute operations of the host processor 110, the memory device 120, processors in various devices, or each component of a processor.

Figure 2:
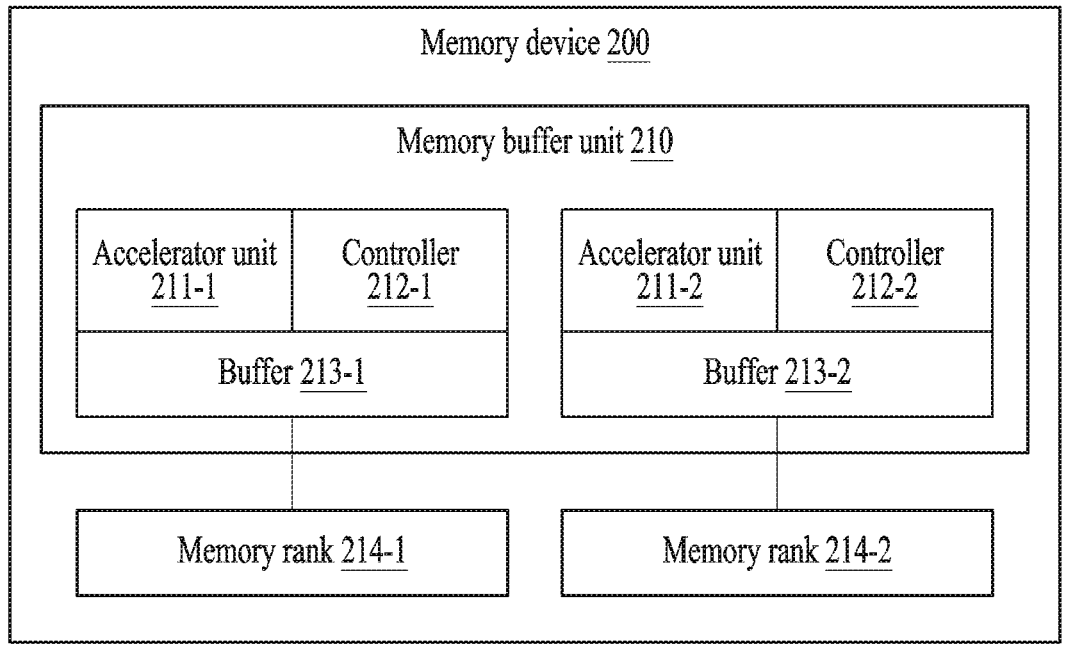
FIG. 2 is a block diagram illustrating an example of a configuration of a memory device according to one or more embodiments of the present disclosure.

FIG. 2 is a block diagram illustrating an example of a configuration of a memory device according to one or more embodiments of the present disclosure.

A memory device 200 according to one or more embodiments of the present disclosure may process data. The memory device 200 may manage a memory region by processing data stored in the memory region. The memory device 200 may be implemented as a volatile memory device or a non-volatile memory device. The volatile memory device may be implemented as a DRAM, a static random-access memory (SRAM), a thyristor RAM (T-RAM), a zero capacitor RAM (Z-RAM), or a twin transistor RAM (TTRAM). The non-volatile memory device may be implemented as an electrically erasable programmable read-only memory (EEPROM), a flash memory, a magnetic random-access memory (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a molecular electronic memory device, or an insulator resistance change memory. In the embodiments of the present disclosure, an example in which the memory device 200 is a DRAM (e.g., an AXDIMM) with an accelerator unit will be mainly described.

The memory device 200 may include a memory buffer unit 210 and memory ranks 214-1 and 214-2. The memory device 200 may execute an operation of an acceleration logic using a near memory processing unit positioned in a memory or a near memory without operation of the host processor 110, therefore increasing processing speed of application programs.

The memory buffer unit 210 may include near memory processing units (e.g., the near memory processing unit 121 of FIG. 1) for each of the memory ranks 214-1 and 214-2.

The near memory processing unit may be implemented within or near a memory rank. FIG. 2 illustrates an example in which the near memory processing unit is implemented near a memory rank. For example, the near memory processing unit may be implemented at a position where the near memory processing unit can directly access data stored in a memory region without passing through a main data bus between a host processor and a memory chip (e.g., a memory rank). For example, the near memory processing unit can be implemented near a physical memory region to enable faster processing of data by bypassing the data bus between the host processor and the memory region, without passing through the data bus.

In some embodiments, each near memory processing unit for each memory rank may include an accelerator unit, a controller, and a buffer. In FIG. 2, a near memory processing unit near the memory rank 214-1 may include an accelerator unit 211-1, a controller 212-1, and a buffer 213-1. Similarly, another near memory processing unit near the memory rank 214-2 may include an accelerator unit 211-2, a controller 212-2, and a buffer 213-2. However, embodiments of the present disclosure are not limited thereto.

A controller may receive a command from a host processor. The controller may process data of a memory region according to the received command. For example, the command may include writing, reading, migrating, and deleting of data in a memory region, executing of an acceleration logic, and allowing or restricting access to a memory region. The controller may receive information about data stored in a buffer from a host processor and read the data. The controller may write data in the buffer and may output information about the written data, for example, the number of bytes written, the location of the data, a status code, or any error messages that occurred during the write operation, to the host processor.

In some examples, the controller may store the data in a near memory region. The near memory region may refer to a storage space accessible by a near memory processing unit (e.g., a controller) without passing through a main data bus between the host processor and the memory region. The controller 212-1 may process data of a memory region corresponding to the memory rank 214-1, which is a near memory region. Similarly, the controller 212-2 may process data of a memory region corresponding to the memory rank 214-2.

For example, a controller of the memory buffer unit 210 implemented by hardware may include at least one of a microprocessor, a CPU, a processor core, a multi-core processor, a multiprocessor, an application-specific integrated circuit (ASIC), or a field-programmable gate array (FPGA).

An accelerator unit may execute an acceleration logic in cooperation with a buffer and a controller. The accelerator unit may include a hardware configuration (e.g., an analog or digital circuit) to execute the acceleration logic. The acceleration logic may be a set of operations or instructions to speed up the processing of data. The acceleration logic may include an operation for a hardware acceleration, and may include, for example, a neural network operation.

A neural network operation may be an operation used in artificial intelligence or machine learning applications. According to some embodiments, artificial neural networks (ANNs) may be in the artificial intelligence or machine learning applications. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

In the memory buffer unit 210, the accelerator units 211-1 and 211-2 may be independently implemented for each rank. The acceleration logic may be processed through the accelerator units 211-1 and 211-2 independent for each rank, and thus a parallel acceleration may be maximized. A rank refers to a segment or portion of the memory device. Each rank may contain one or more memory chips and may be independently accessible. The accelerator unit 211-1 may execute the acceleration logic based on data of the memory region corresponding to the memory rank 214-1, which is the near memory region. Similarly, the accelerator unit 211-2 may execute the acceleration logic based on data of the memory region corresponding to the memory rank 214-2. For example, a hardware-implemented accelerator unit may include at least one of a microprocessor, a CPU, a processor core, a multi-core processor, a multiprocessor, an ASIC, an FPGA, or a graphics processing unit (GPU).

A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

A buffer may store data. The buffer may include an input buffer and an output buffer. The buffer may operate as an input buffer or an output buffer. The buffer 213-1 may be connected to the memory rank 214-1. The buffer 213-2 may be connected to the memory rank 214-2.

A memory region of the memory device 200 may be configured to operate in a system memory mode or an accelerator mode. In embodiments of the present disclosure, for convenience of description, an example in which a memory region corresponds to a portion of or an entire arbitrary memory rank is described, however, the embodiments of the present disclosure are not limited thereto. A memory region may also be configured over multiple memory ranks.

For example, the memory buffer unit 210 may be implemented in a memory buffer of a dual in-line memory module (DIMM) to process data. In this example, the accelerator units 211-1 and 211-2 and the controllers 212-1 and 212-2 may process the data while efficiently using an internal bandwidth of the DIMM. Internal bandwidth refers to the amount of data that can be transferred within the DIMM, without the need to use external buses or interfaces to access data stored in other memory modules or devices. The memory buffer unit 210 of the DIMM may perform parallel processing of data for each rank by performing operation functions distributed to corresponding ranks through near memory processing units arranged for each rank. Accordingly, the memory buffer unit 210 may prevent a delay time for access to data in a memory region and effectively reduce external bus traffic.

Figure 3:
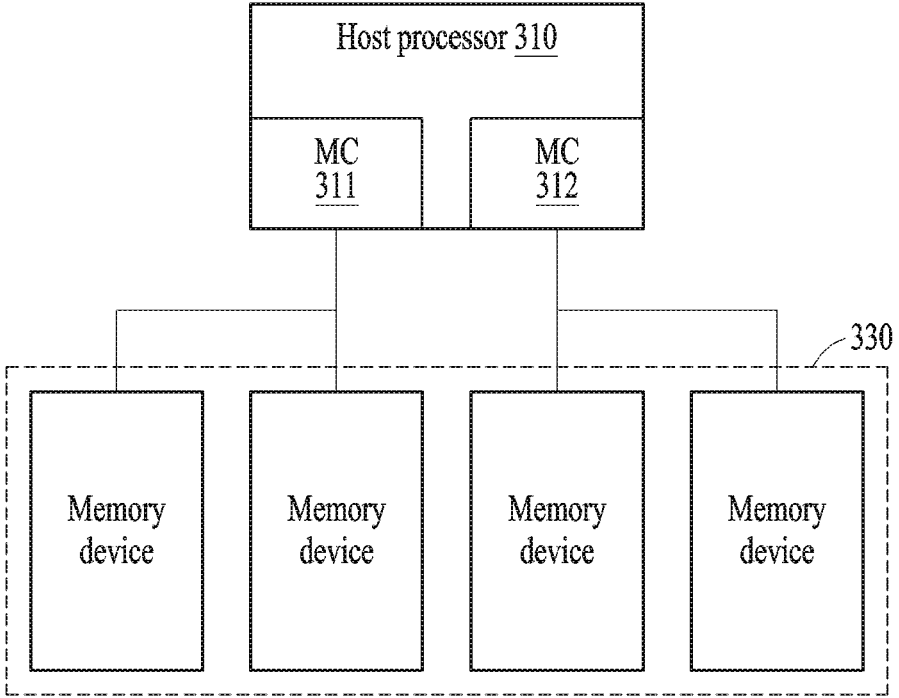
FIGS. 3 and 4 illustrate an example of a connection relationship between a host processor and a memory device according to one or more embodiments of the present disclosure.
Figure 4:
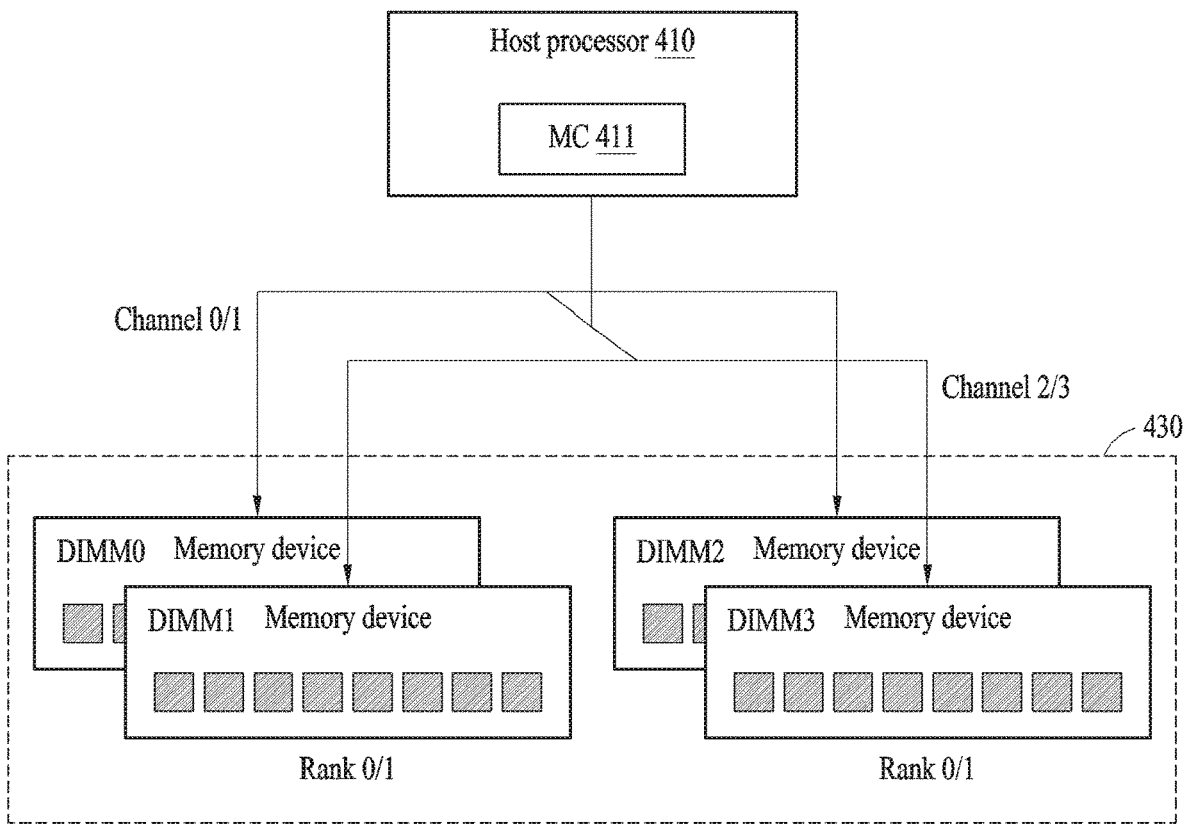

FIGS. 3 and 4 illustrate an example of a connection relationship between a host processor and a memory device according to one or more embodiments of the present disclosure.

For example, FIG. 3 illustrates an example of a CPU-based DIMM acceleration structure, and FIG. 4 illustrates an example of a DIMM-based multi-rank structure.

In FIG. 3, a host processor 310 may include a plurality of memory controllers 311 and 312. The host processor 310 may process data of a plurality of memory devices 330 using the plurality of memory controllers 311 and 312. The memory controllers 311 and 312 may support two dual in-line memory modules (DIMMs) or alternative extension DIMMs (AXDIMMs) per channel. For example, each channel of the memory controllers 311 and 312 can accommodate two DIMMs or AXDIMMs.

In FIG. 4, a host processor 410 may include a single memory controller 411. The host processor 410 may process data of a plurality of memory devices 430 using the single memory controller 411. For example, memory devices DIMM0 and DIMM2 may be controlled through channels 0 and 1. Memory devices DIMM1 and DIMM3 may be controlled through channels 2 and 3.

Depending on the host processor 310 or 410 and board configuration, a topology of mountable DIMMs may vary. The topology of mountable DIMMs refers to physical arrangement of the DIMMs on the board, including the number of DIMMs per channel, the type of DIMMs supported, and the maximum capacity of each DIMM slot.

In some examples, a memory buffer unit of each memory device is configured within or near a memory module, allowing for scalable execution of data processing and acceleration logic in various configurations. The host processors 310 or 410 may identify each DIMM accelerator unit mapped to a memory rank, generate a command, and input the command to each DIMM accelerator unit, to operate each DIMM accelerator unit.

Figure 5:
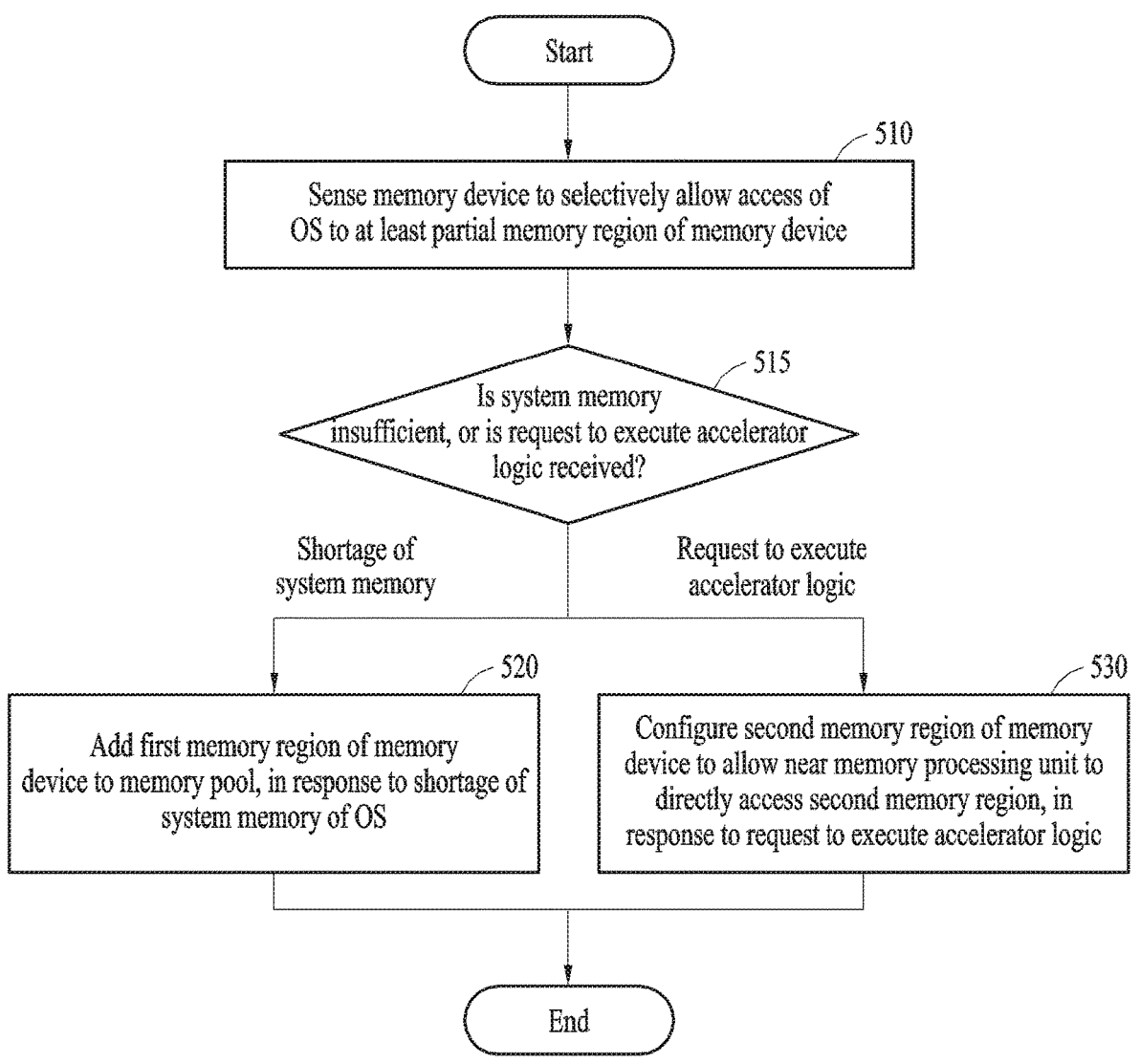
FIG. 5 is a flowchart illustrating a memory management method according to one or more embodiments of the present disclosure.

FIG. 5 is a flowchart illustrating a memory management method according to one or more embodiments of the present disclosure.

Referring to FIG. 5, in operation 510, a host processor senses or detects a memory device to selectively allow access of an OS to at least a partial memory region of a memory device. The host processor (e.g., a CPU) may include a memory controller connected to a memory device including a near memory processing unit. The near memory processing unit may include an accelerator unit as described above with reference to FIG. 2. An AXDIMM is an example of a memory device with an accelerator unit.

According to one or more embodiments of the present disclosure, the host processor configures a memory region of the memory device for use in a memory pool of the OS in response to the system memory shortage. The host processor may recognize the memory device to selectively allow access to a memory region based on the OS executed in the host processor. The host processor may recognize a region available by the OS among memory regions of the memory device to dynamically change and configure the region. In some examples, the host processor may detect the memory device so that at least a partial memory region of the memory device may be selectively provided to a memory pool of the OS. The OS executed by the host processor may detect a memory device including an accelerator unit (e.g., a near-memory accelerator) as hardware that is partially or fully reconfigurable to operate in a system memory mode or an accelerator mode (e.g., a devdax mode).

For example, an electronic device with a host processor may be booted using a basic input/output system (BIOS) component. The BIOS component may be a software component that includes BIOS operated as firmware, which may initialize and run various hardware components. A BIOS component may also manage data flow between a processor and various other components, e.g., peripheral components, input/output control component, etc. A BIOS component may include a program or software stored in ROM, flash memory, or any other non-volatile memory. The BIOS may be a standardized booting sequence interface. During booting, the host processor may recognize a device according to a standard interface defined in the specification (e.g., Unified Extensible Firmware Interface (UEFI), and Advanced Configuration and Power Interface (ACPI)).

In some embodiments, the host processor recognizes the memory device using a protocol interface capable of selectively allowing or restricting access to a memory region based on the OS during runtime. For example, the host processor may recognize a memory device including an accelerator unit as a device that is selectively configurable to operate in a direct file access (DAX) mode or a system memory mode in an interface protocol when the BIOS is booted. The DAX mode may be a mode in which the host processor directly accesses a media (e.g., a memory device) by bypassing an input/output (I/O) stack. The system memory mode may be a mode in which the host processor accesses the memory device via the I/O stack and provides a memory region of the memory device to a memory pool. However, the interface protocol used to recognize the memory device is not limited thereto and may vary depending on the design.

As described above, since dynamic reconfiguration of the memory region of the memory device is possible during runtime of the electronic device, the host processor may selectively provide the memory region to the memory pool without rebooting. For example, the host processor may add at least a partial memory region of the memory device (e.g., an AXDIMM) to a memory pool (e.g., a system memory pool) of the OS, or may exclude the memory region from the memory pool. The memory pool may be a pool of memory resources for a memory management to perform the dynamic memory allocation.

In operation 515, the host processor identifies a request associated with the memory device. For example, the host processor may identify a request to execute an acceleration logic. For example, the host processor may determine whether a system memory is insufficient or whether a request to execute an acceleration logic is received.

In operation 520, the host processor adds a first memory region of the memory device to the memory pool of the OS based on an allowed access of the OS to the first memory region, in response to a shortage of a system memory of the OS. An operation of adding the first memory region to the memory pool may vary depending on whether there is an unused memory rank and whether there is an available memory region (e.g., an idle memory region) among the memory ranks used for the acceleration logic.

In an example, when the first memory region is determined to be in an unused memory rank, the host processor may add the corresponding first memory region to the memory pool. In another example, when the first memory region is determined to be in a used memory rank, the host processor may allow the OS to access the first memory region. In some cases, a memory rank being used for the acceleration logic is a state of being invisible to the OS, and the host processor may change a state of a partial memory region in the memory rank to a state of being visible to the OS. The host processor may add the first memory region, to which the OS is allowed to access, to the memory pool. An example of switching from the accelerator mode to the system memory mode will be described below with reference to FIGS. 7 and 8.

In operation 530, the host processor configures a second memory region of the memory device to allow the near memory processing unit to directly access the second memory region, in response to the request to execute the acceleration logic. The operation of configuring the second memory region may vary depending on whether an unused memory rank is detected and the size of an available memory region in a memory rank that is included in a system memory pool.

In an example, when the second memory region is determined to be in an unused memory rank, the host processor may configure the second memory region to restrict access based on the OS to the second memory region. In another example, when the second memory region is determined to be in a memory rank included in the system memory pool, the host processor may restrict access of the near memory processing unit to the memory region based on the determination.

In some examples, the host processor excludes the second memory region from the system memory pool to restrict access based on the OS to the second memory region. The host processor may cause the accelerator unit to execute the acceleration logic using the second memory region. The host processor may add the memory region to the memory pool during a continuous operation of the electronic device. An example of switching from the system memory mode to the accelerator mode will be described below with reference to FIGS. 9 and 10.

Figure 6:
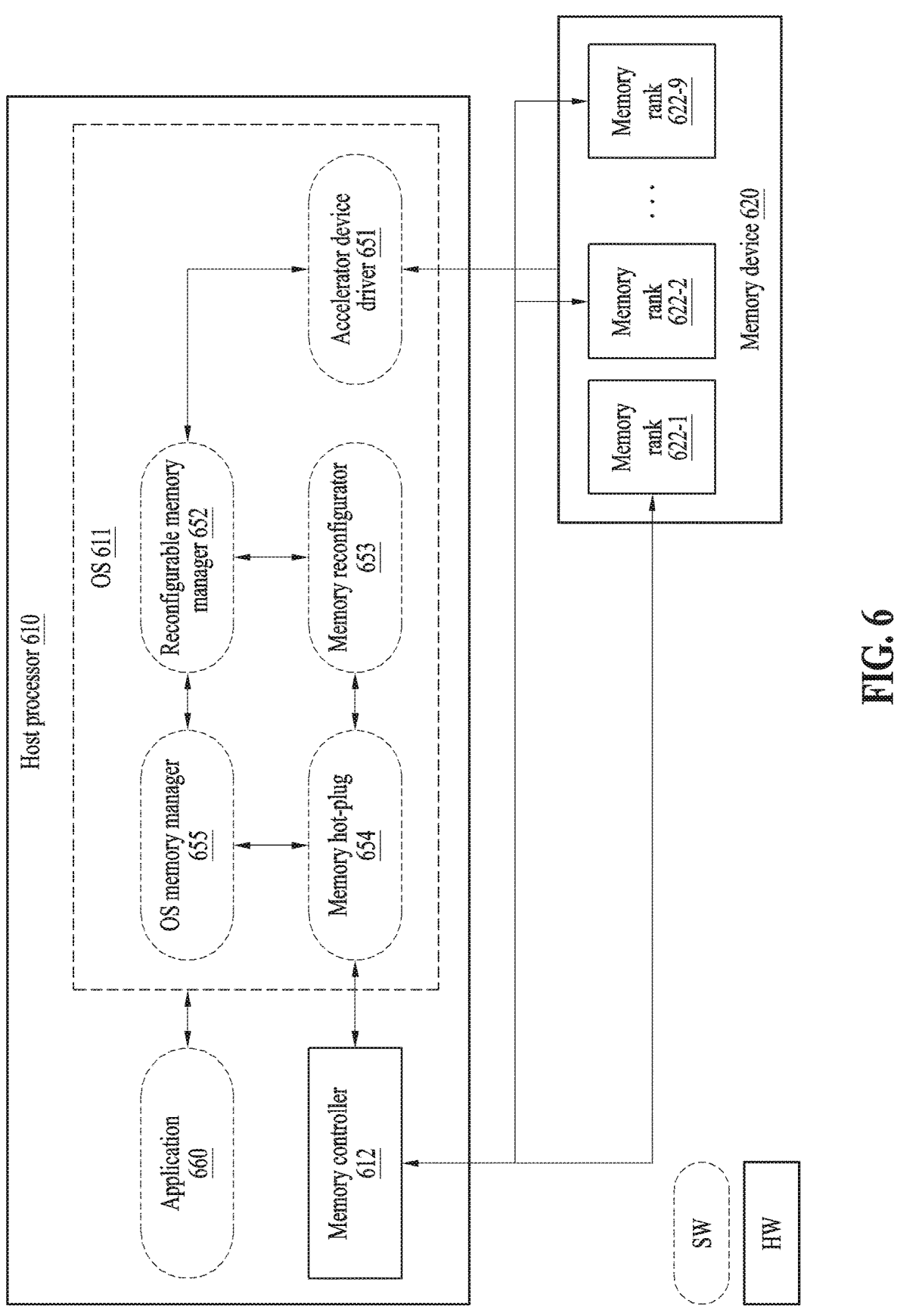
FIG. 6 illustrates an operation of an operating system (OS) executed in a host processor according to one or more embodiments of the present disclosure.

FIG. 6 illustrates an operation of an OS executed in a host processor according to one or more embodiments of the present disclosure.

According to one or more embodiments of the present disclosure, a host processor 610 may execute an OS 611. As described above, the host processor 610 may recognize a memory device 620 during a process of booting the OS 611. The host processor 610 may dynamically reconfigure a memory region for the OS 611 and a memory region for an acceleration operation for a memory rank, partial region, or entire memory in the memory device 620, using the recognized memory device 620. The host processor 610 may execute an application program 660. The host processor 610 may manage data of the memory device 620 to execute the application program 660. Data of the application program 660 may be stored in the memory device 620 on a page basis (e.g., a 4-KB basis). The application program 660 may include system software.

The host processor 610 may execute an accelerator device driver 651, a reconfigurable memory manager 652, a memory reconfigurator 653, a memory hot-plug 654, and an OS memory manager 655 in the OS 611. The above-described modules may be software modules that operate in the OS 611 or in cooperation with the OS 611.

The accelerator device driver 651 may recognize the memory device 620 that is manifested with a capability (e.g., a size and offset) including an available physical memory region. For example, the memory device 620 may be an AXDIMM hardware that includes an accelerator chip in addition to DRAM chips, and may be exposed as a DAX device to the OS 611 (e.g., a Linux OS) by a BIOS. For reference, the accelerator device driver 651 of the OS 611 may detect an exportable memory region that is to be used as a system memory. Since a predetermined memory region is mapped to, for example, a device configuration register, in each memory rank of the memory device 620, it may be difficult to export the predetermined memory region. Thus, memory regions other than the predetermined memory region may be used as a system memory.

In addition, the accelerator device driver 651 may exchange information about the memory device 620 with the reconfigurable memory manager 652. The information about the memory device 620 may include information about the availability of memory regions in the device 620 and other relevant information. For example, the accelerator device driver 651 may send information indicating a state of the memory device 620 to the reconfigurable memory manager 652.

The accelerator device driver 651 may manage the recognized memory device 620. For example, the accelerator device driver 651 may lock or unlock a partial memory region of the memory device 620. For example, the accelerator device driver 651 may prevent or allow access to a specific portion of the memory device 620 by other processes or devices. When a memory region is locked, other processes or devices are prevented from accessing or modifying the data stored in that region. When a memory region is unlocked, other processes or devices can access or modify the data stored in that region. For example, the accelerator device driver 651 may be implemented as a DAX device driver. The DAX device driver may be a device driver extended as a component of an AXDIMM device controller, and may manage a DAX device.

The reconfigurable memory manager 652 may determine whether to reconfigure the memory region of the memory device 620. In an example, the reconfigurable memory manager 652 may determine whether the OS 611 is in a low memory state. A low memory state refers to a situation where the operating system (OS) 611 is experiencing a shortage of available system memory for running applications and processes. In some examples, the reconfigurable memory manager 652 may receive a request for an acceleration logic from a user. The reconfigurable memory manager 652 may be implemented to utilize a near memory.

When it is determined that the memory region is to be reconfigured, the reconfigurable memory manager 652 may request the memory reconfigurator 653 to reconfigure the memory region. Reconfiguring the memory region may be performed when the available memory in the current configuration is not sufficient for the current workload or when there is a need to optimize the memory usage for a specific task. The reconfigurable memory manager 652 may determine if reconfiguring the memory region can improve the performance or efficiency of the system. In an example, the reconfigurable memory manager 652 may request the memory reconfigurator 653 to export a memory region available in the memory device 620 as a system memory region. In some examples, the reconfigurable memory manager 652 may request the memory reconfigurator 653 to configure a memory region excluded from a memory pool of the OS 611 as an accelerator memory region.

In some examples, the reconfigurable memory manager 652 may inform the accelerator device driver 651 of a reconfiguration, which includes switching between a system memory mode and an accelerator mode of the memory region of the memory device 620. The reconfigurable memory manager 652 may also migrate data from a partial memory region to another memory region.

The memory reconfigurator 653 may reconfigure the memory region of the memory device 620, using the memory hot-plug 654. According to one or more embodiments of the present disclosure, the memory reconfigurator 653 may configure the memory region of the memory device 620 to operate in one of the accelerator mode and a system memory mode. Accordingly, an electronic device may reconfigure the memory region of the memory device 620, by skipping rebooting of the OS 611. The memory reconfigurator 653 may dynamically adjust a memory size available in a near memory processing unit and a memory size available in the OS 611, using an OS memory hot-plugging mechanism of the OS 611.

For example, the memory reconfigurator 653 may reconfigure the memory region of the OS 611 to be online or offline. "Online" and "offline" refer to the state of a memory region with respect to the OS. For example, when a memory region is online, it is available and visible to the OS for use. When a memory region is offline, it is not available or visible to the operating system, and access to the region is restricted. The memory region reconfigured to be online may be visible to the OS 611. The memory region reconfigured to be offline may be invisible to the OS 611. The memory reconfigurator 653 may reconfigure a memory region in the memory pool, using the memory hot-plug 654. The memory reconfigurator 653 may activate the memory region with respect to the OS 611 by reconfiguring the memory region to be online. The activated memory region may be added to the memory pool. The memory reconfigurator 653 may deactivate the memory region with respect to the OS 611 by reconfiguring the memory region to be offline. The deactivated memory region may be excluded from the memory pool.

The memory reconfigurator 653 may export a memory region used as a system RAM and an available memory size, in response to a request of the reconfigurable memory manager 652. The memory reconfigurator 653 may export a memory region available as a system RAM, using the memory hot-plug 654.

For reference, the memory reconfigurator 653 may be implemented as a Linux DAX kmem driver that provides a memory reconfiguration function.

The memory hot-plug 654 may be an operation of adding an available memory capacity to the memory pool of the OS 611 while the system is running, executed by the host processor 610. For example, the electronic device may add at least a partial memory region of a physical memory to the memory pool through the memory hot-plug 654. A memory hot-unplug may be an operation of reducing the memory size available in the memory pool of the OS 611 at runtime. For example, the electronic device may exclude at least a partial memory region of a physical memory included in the memory pool of the OS 611 from the memory pool through the memory hot-unplug.

The OS memory manager 655 may allocate a memory included in the memory pool of the OS 611 to an application or a function of the OS 611, or free the memory.

In the above-described memory device, the memory controller 612 may perform operations including switching the mode of a memory region, executing a command to add or exclude a memory region to or from a memory pool, or transmitting data.

According to one or more embodiments of the present disclosure, the electronic device may dynamically reconfigure individual memory regions in each of memory ranks 622-1, 622-2, and 622-9 of the memory device 620 without rebooting the OS 611. This allows for more efficient utilization of the memory ranks simultaneously by the accelerator and OS 611, thus increasing resource usage rate. In addition, embodiments of the present disclosure are not limited thereto, and the electronic device may also reconfigure each memory rank or the entire memory device 620 according to workloads without rebooting.

In some examples, a first memory region of the memory device and a memory rank including the first memory region are in the system memory mode, and the host processor 610 may add the first memory region to the memory pool. Hereinafter, a dynamic reconfiguration operation in an example in which a first memory region to be added to a memory pool of an OS is in an accelerator mode will be described with reference to FIG. 7.

Figure 7:
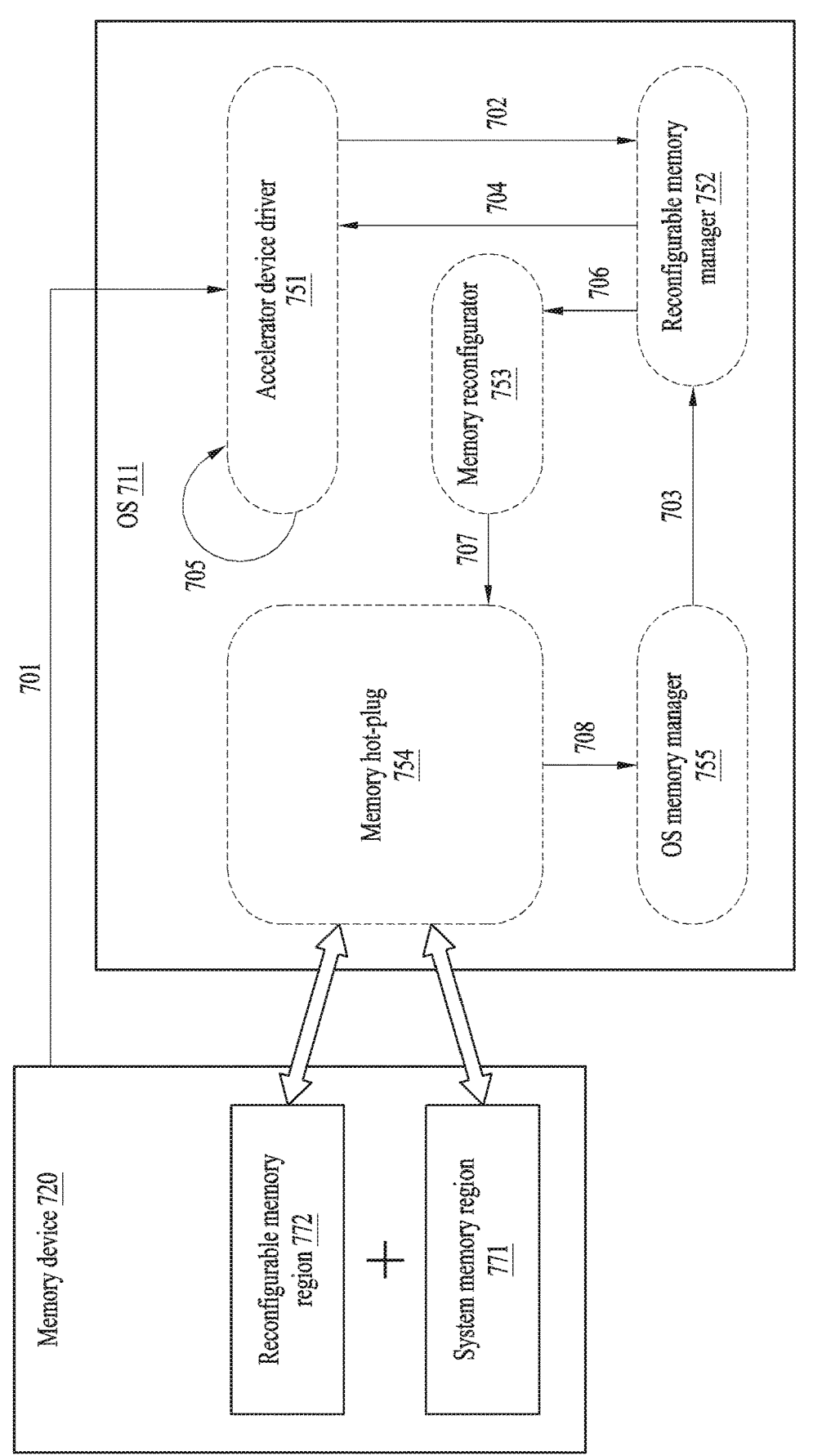
FIG. 7 illustrates an operation of switching a memory region from an accelerator mode to a system random-access memory (RAM) mode in a memory device according to one or more embodiments of the present disclosure.

FIG. 7 illustrates an operation of switching a memory region from an accelerator mode to a system memory mode in a memory device according to one or more embodiments of the present disclosure.

In operation 701, a host processor may recognize a memory device 720. When an OS 711 is booted, the memory device 720 may be recognized to an accelerator device driver 751 as a device (e.g., a DAX device) that is dynamically reconfigurable between the system memory mode and the acceleration mode.

In operation 702, the accelerator device driver 751 may communicate information about a recognized device to a reconfigurable memory manager 752. For example, the accelerator device driver 751 may send information about a capability of the recognized memory device 720 to the reconfigurable memory manager 752.

In operation 703, the reconfigurable memory manager 752 may determine whether the OS 711 is in a low memory state. The host processor may determine that a system memory of the OS is insufficient by detecting an attempt by the OS to swap data of the memory pool of the OS. The host processor may determine there is a system memory shortage based on the determination. For example, the reconfigurable memory manager 752 may detect an attempt to swap a portion of data in a memory pool (e.g., a system memory pool) to a disk (e.g., a hard disk drive (HDD) or a solid state drive (SSD)) from an OS memory manager 755. Swapping may refer to a memory management scheme to solve a memory shortage phenomenon by moving a portion of an allocated memory to an auxiliary storage device (e.g., an SSD or an HDD) with a relatively large capacity, when a main memory region to be allocated to an application program or the OS 711 is insufficient in a computing system. In some cases, determining of whether a memory is insufficient is not limited thereto, and the reconfigurable memory manager 752 may receive a state of the memory pool from the OS memory manager 755 and determine whether the memory is insufficient based on the remaining memory size. For example, if the size of an available system memory is less than a threshold size, the reconfigurable memory manager 752 may determine that the memory is insufficient.

In operation 704, the reconfigurable memory manager 752 may communicate information of a reconfiguration to the accelerator device driver 751. For example, if the system memory is insufficient, the reconfigurable memory manager 752 may communicate to the accelerator device driver 751 that a memory region or memory rank configured in the accelerator mode in the memory device 720 is to be reconfigured.

In operation 705, the accelerator device driver 751 may change or mark a state of the memory region or the memory rank of the corresponding memory device 720 to a state of not being available.

In operation 706, the reconfigurable memory manager 752 may request a memory reconfigurator 753 to export a first memory region, which is determined as an available memory region in the memory device 720, as a system memory region 771.

In operation 707, the memory reconfigurator 753 may export the first memory region to the memory pool, using a memory hot-plug 754 of a core of the OS 711. For example, the memory reconfigurator 753 may add the first memory region to the memory pool using a memory hot-plug 754 of a core of the OS 711. For example, the memory reconfigurator 753 may reconfigure a memory region (e.g., the first memory region) that is intended to be used as the system memory and set its status to be online with respect to the OS 711.

In operation 708, the OS memory manager 755 may activate the first memory region. For example, the OS memory manager 755 may add the first memory region configured to be online to a system memory pool. In some examples, the OS memory manager 755 may add the memory region 772 that has been reconfigured to the system memory mode from the accelerator mode to the memory pool that includes the system memory region 771.

According to one or more embodiments of the present disclosure, the host processor may also reconfigure a partial rank or a partial memory region of the memory device 720. For example, the reconfigurable memory manager 752 may determine that a reconfiguration of a partial rank or a partial memory region (e.g., a half region of a rank #1 and all regions of a rank #0 in the memory device 720 with four memory ranks) of the memory device 720 is to be utilized. The reconfigurable memory manager 752 may use the information provided by the accelerator device driver 751 in operation 702 described above. In operation 705, the accelerator device driver 751 may lock a partial memory region of a memory rank. In operation 706, the memory reconfigurator 753 may reconfigure a partial memory region (e.g., the first memory region) in a target memory rank for reconfiguration, so that the partial memory region may be in the system memory mode.

A portion of the operations described above with reference to FIG. 7 may be performed in an order different from that described, may be performed in parallel with other operations, or may be omitted, depending on the design.

Hereinafter, a series of operations related to a system memory shortage, including the operations described above with reference to FIG. 7 will be described with reference to FIG. 8.

Figure 8:
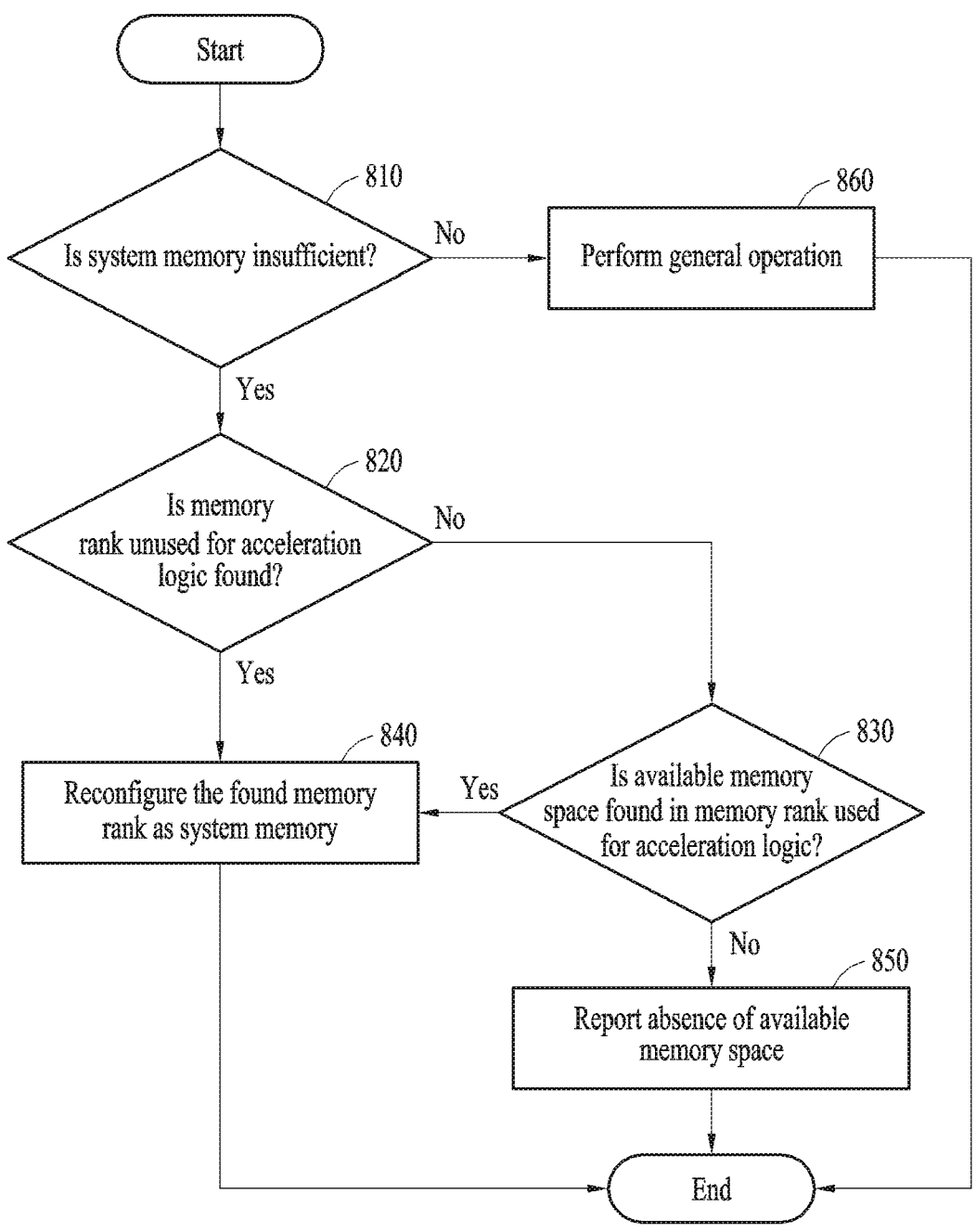
FIG. 8 is a flowchart illustrating an operation performed based on whether a system memory is insufficient in a host processor according to one or more embodiments of the present disclosure.

FIG. 8 is a flowchart illustrating operations performed based on whether a system memory is insufficient in a host processor according to one or more embodiments of the present disclosure.

In operation 810, the host processor detects a system memory shortage for the operation of an operating system (OS). For example, the host process may determine whether the system memory is insufficient. For example, the host processor may determine that a system memory of an OS is insufficient to perform an operation of the host processor. In some examples, the determination is based on detecting an attempt to swap data in a memory pool of the OS. In some cases, embodiments of the present disclosure are not limited thereto. In some examples, when an available memory size of the memory pool is less than a threshold size, the host processor may also determine that the system memory is insufficient.

In operation 820, after a determination that the system memory is insufficient, the host processor determines whether a memory rank is unused for an acceleration logic, where the memory region is located within the memory rank. In some examples, the host processor may determine if there is unused memory rank that can be used for acceleration logic. In some examples, the host processor may search for, among memory ranks that are in the accelerator mode, a memory rank that is not being used for the acceleration logic.

For example, the host processor may search for a memory rank that is not currently involved in performing an acceleration logic. For example, if an unused memory rank is detected, the host processor may determine a memory region of the unused memory rank as a first memory region of the unused memory rank for reconfiguration. The first memory region may be a partial memory region of the unused memory rank.

When the memory rank unused for the acceleration logic is not detected, the host processor may search for an available memory space from a memory rank used for the acceleration logic in operation 830. For example, the host processor may search for a remaining memory region from memory ranks configured to operate in the accelerator mode in a memory device. When the unused memory rank is not detected, the host processor may determine an available memory region in a used memory rank as the first memory region.

In operation 840, the host processor reconfigures the detected unused memory rank as the system memory. The host processor may add the memory rank to the memory pool based on the determination that the memory rank is unused. In some cases, the host processor may reconfigure the memory region based on whether all regions or a portion of the regions in a memory rank is available. For example, based on a determination that a memory rank is unused for the acceleration logic in the memory device, the host processor may add a first memory region that is located in the detected unused memory rank to the memory pool. When a memory rank unused for the acceleration logic is in the accelerator mode, the host processor may change all available memory regions of the memory rank to a system memory mode and add the available memory regions to the memory pool.

In some examples, when the first memory region in the memory rank being used for the acceleration logic is available, the host processor may configure the first memory region to restrict access of a near memory processing unit to the first memory region. The host processor may add the first memory region to the memory pool without rebooting. The host processor may reconfigure the first memory region configured to operate in the accelerator mode in the memory device to operate in the system memory mode, through the operations described above with reference to FIG. 7.

When it is determined there is no memory rank unused for the acceleration logic and there is no available memory region located in the used memory rank, the host processor may report an absence of an available memory space in operation 850. When the system memory is not insufficient, the host processor may continue to perform a general operation in operation 860.

Figure 9:
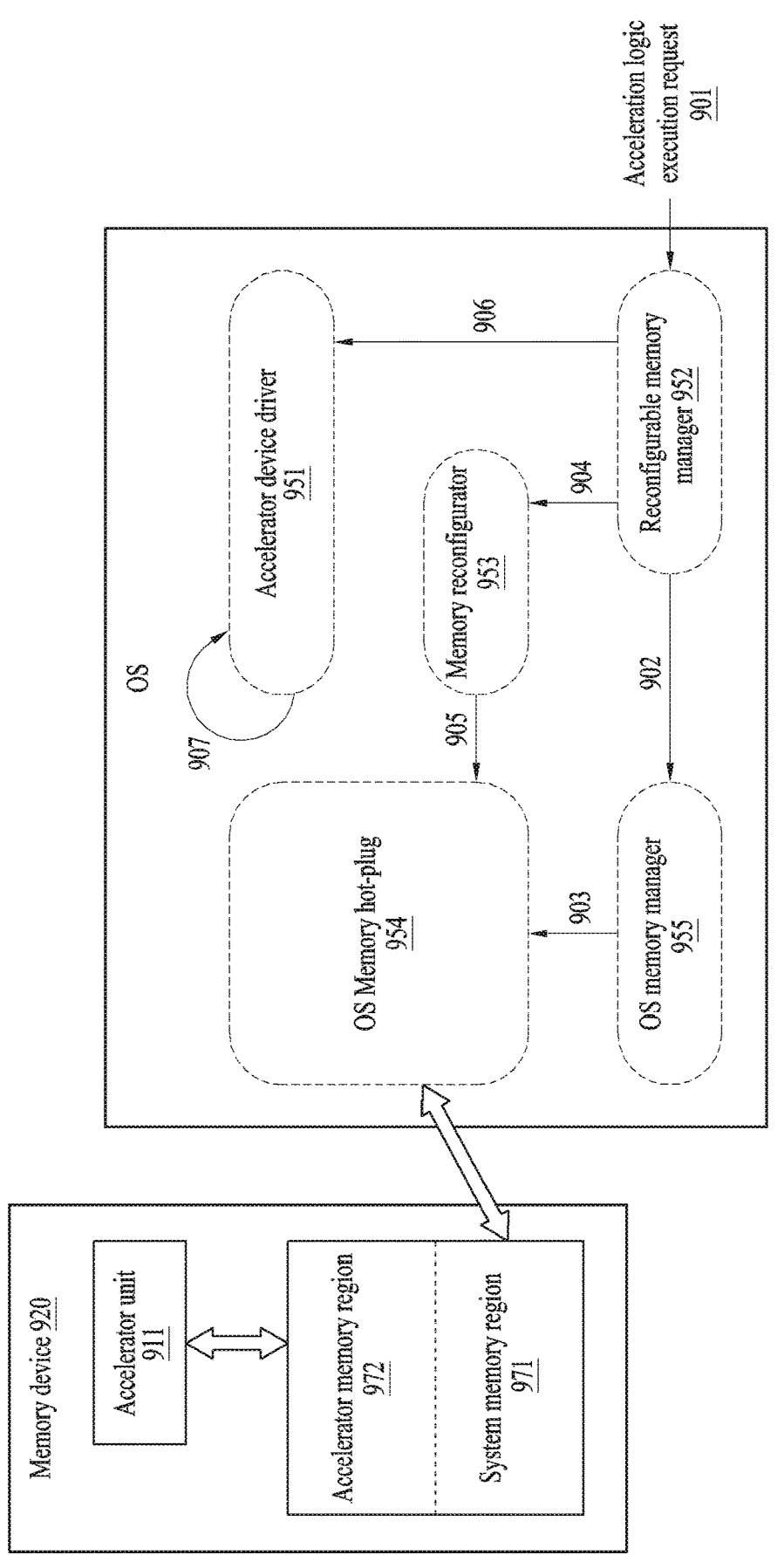
FIG. 9 illustrates an operation of switching a memory region from a system memory mode to an accelerator mode in a memory device according to one or more embodiments of the present disclosure.

FIG. 9 illustrates an operation of switching a memory region from a system memory mode to an accelerator mode in a memory device according to one or more embodiments of the present disclosure.

In operation 901, a reconfigurable memory manager 952 receives an acceleration logic execution request. In an example, the reconfigurable memory manager 952 may receive an input to request an acceleration logic from a user of an electronic device. In some examples, when the electronic device is a server, the reconfigurable memory manager 952 may receive an input to request an acceleration logic from an external device.

In operation 902, the reconfigurable memory manager 952 searches for and identifies a second memory region within a system memory region 971 that needs to be reconfigured to operate in the accelerator mode. The reconfigurable memory manager 952 may migrate data from the second memory region to another memory region without incurring data loss.

In some examples, in a multi-core CPU socket, the second memory region may be determined based on a non-uniformed memory access (NUMA) node. The NUMA node may be a node in which CPU cores using the same local memory are grouped. The second memory region may be determined as a memory region used in an arbitrary NUMA node.

In operation 903, an OS memory manager 955 restricts access to an individual memory region to make the individual memory region offline. For example, the OS memory manager 955 may configure the second memory region to be invisible to an OS by deactivating the second memory region. Accordingly, access to the second memory region based on the OS may be restricted.

In operation 904, the reconfigurable memory manager 952 requests a memory reconfigurator 953 to reconfigure the second memory region, which was previously configured to be offline, to be available for operation in the accelerator mode.

In operation 905, the memory reconfigurator 953 excludes the second memory region from a memory pool, through an OS memory hot-plug 954. For example, the memory reconfigurator 953 may exclude the second memory region from the memory pool.

In operation 906, the reconfigurable memory manager 952 returns the second memory region back to the accelerator device driver 951.

In operation 907, the accelerator device driver 951 changes a state of the second memory region to a state of being "available". The second memory region may be configured to operate in an accelerator mode. A memory region configured to operate in the accelerator mode may be referred to as an accelerator memory region 972. As shown in FIG. 9, a memory region in the system memory mode may be referred to as a system memory region 971.

Accordingly, a host processor may reconfigure the second memory region that is being used as the system memory region 971 already in the memory device 920 as the accelerator memory region 972, and may allow access to the second memory region based on an accelerator unit 911.

In some examples, the accelerator memory region 972 and the system memory region 971 are in the same memory rank. In some examples, the accelerator memory region 972 and the system memory region 971 are in different memory ranks. In some examples, when the host processor prioritizes a memory utilization, the accelerator memory region 972 and the system memory region 971 are configured to be in the same memory rank. When the host processor prioritizes an acceleration speed, the accelerator memory region 972 and the system memory region 971 may be configured to be in different memory ranks.

Figure 10:
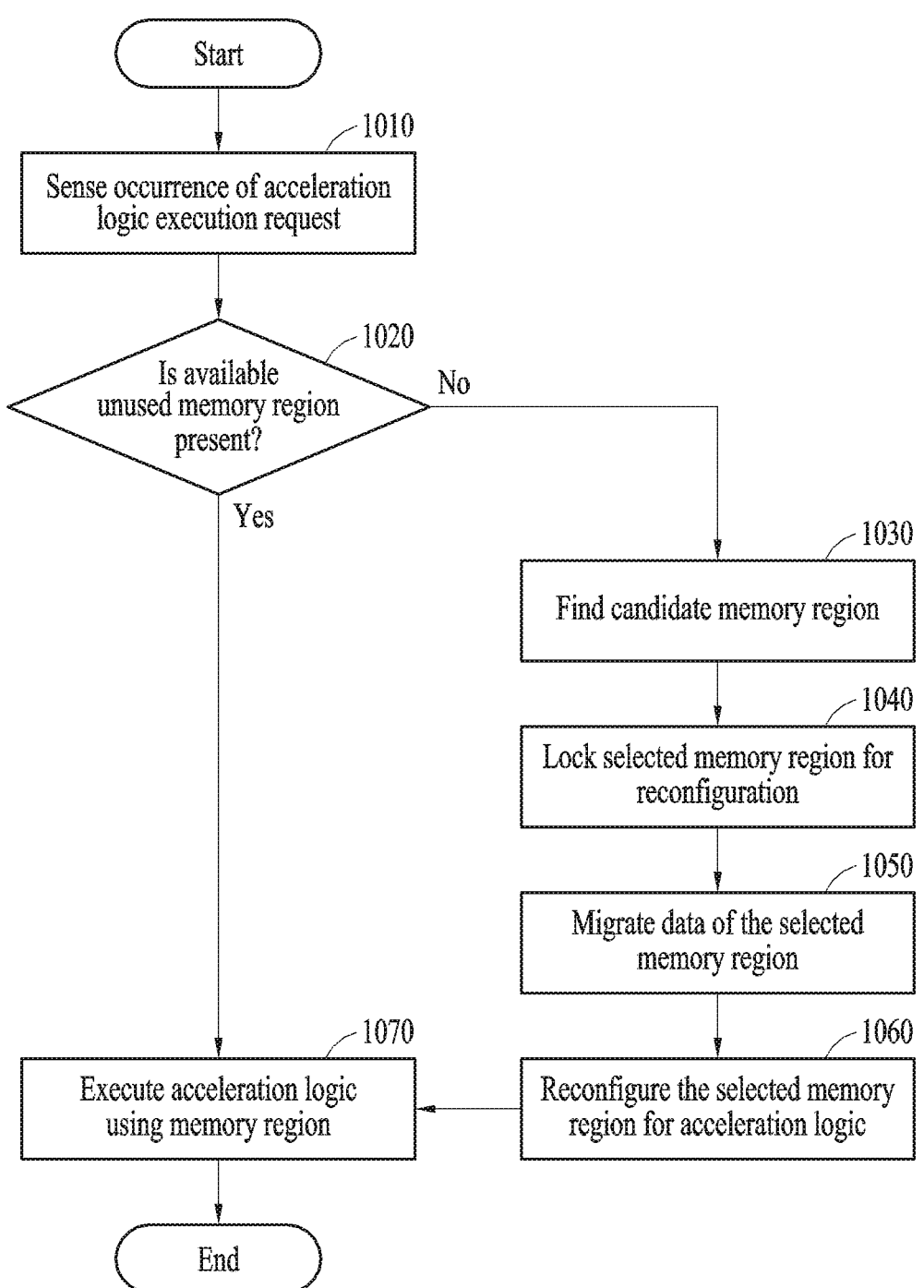
FIG. 10 is a flowchart illustrating an operation performed based on whether an acceleration logic execution request occurs in a host processor according to one or more embodiments of the present disclosure.

FIG. 10 is a flowchart illustrating an operation performed based on whether an acceleration logic execution request occurs in a host processor according to one or more embodiments of the present disclosure.

In operation 1010, the host processor may detect an occurrence of an acceleration logic execution request. For example, the host processor may receive an acceleration logic execution request from a user input of an electronic device or from an external device.

In operation 1020, the host processor determines whether an available unused memory region is detected. When a memory rank in which an acceleration logic is executable is detected from among unused memory ranks, the host processor may cause a near memory processing unit to execute the acceleration logic using a second memory region within the detected memory rank in operation 1070. In some examples, all memory ranks may be currently used for different tasks (e.g., an operation of an OS or an operation of an application program). Here, the host processor may determine whether the memory size of an available memory region of each memory rank is insufficient to execute the acceleration logic.

When the memory size of the available memory region is sufficient to execute the acceleration logic, the host processor may execute the acceleration logic using the available memory region in operation 1070. When the memory size of the available memory region is greater than a memory size for an execution of the acceleration logic, the host processor may determine that the memory size of the available memory region is sufficient to execute the acceleration logic.

In some cases, if it is determined that the memory size of the available memory region is insufficient to execute the acceleration logic, the host processor may secure a memory region for the execution of the acceleration logic by organizing candidate memory regions used for different tasks, which will be described below.

For example, in operation 1030, the host processor identifies a candidate memory region. The host processor may search for a candidate memory region from a memory rank used in a memory pool. The host processor may identify the memory region from among the at least one candidate memory region. The host processor may cause the near memory processing unit to execute the acceleration logic using the memory region. For example, the host processor may search for and identify a region corresponding to the memory size for the execution of the acceleration logic and having migratable data as a candidate memory region. The host processor may determine the second memory region from among candidate memory regions.

In operation 1040, the host processor locks a selected memory region (e.g., the second memory region) for reconfiguration. After identifying a memory region in the memory rank that is used in the memory pool, the host processor may exclude the memory region from the memory pool, configure the memory region to restrict access of the OS to the memory region, and allow direct access of the near memory processing unit to the memory region.

According to one or more embodiments of the present disclosure, the host processor may exclude the second memory region from the memory pool. The host processor may restrict access of the OS to the second memory region. For example, the host processor may restrict access to the selected memory region (e.g., the second memory region) based on the OS. The locked second memory region may be configured to be offline from a memory pool of the OS.

In some examples, the host processor may determine that a memory rank comprises a system memory region and a memory region for the acceleration logic. The host processor may detect an available memory region in another memory rank. The host processor may migrate data of the system memory region to the other memory rank.

In operation 1050, the host processor migrates data of the selected memory region. For example, the host processor may migrate data from the second memory region to another memory region (e.g., another memory rank). Accordingly, a loss of data stored in the second memory region may be prevented.

In operation 1060, the host processor reconfigures the selected memory region for an acceleration logic. The host processor may configure the second memory region to allow direct access of the near memory processing unit to the second memory region. For example, the host processor may reconfigure the second memory region to operate in an accelerator mode. An accelerator unit of the memory device may be accessible to the second memory region.

In operation 1070, the host processor executes the acceleration logic using the memory region. For example, the host processor may cause the near memory processing unit to execute the acceleration logic using the second memory region within the detected memory rank. The host processor may cause the acceleration logic to be executed using the memory region when migration of the data is completed. For example, when the migrating of the data in operation 1050 described above is completed, the host processor may cause the acceleration logic to be executed using the second memory region.

Figure 11:
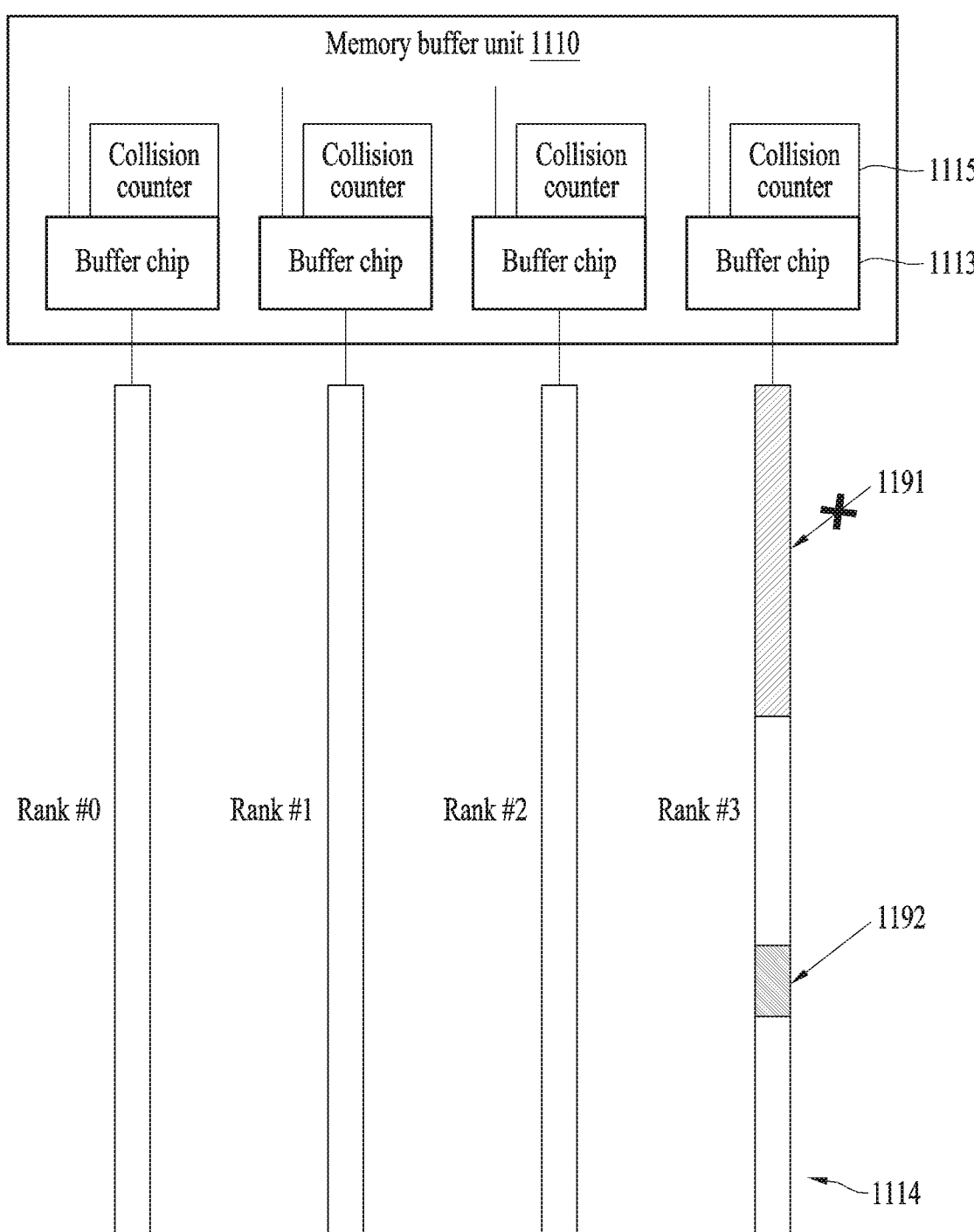
FIG. 11 illustrates a system for memory reconfiguration to mitigate a memory rank collision according to one or more embodiments of the present disclosure.

FIG. 11 illustrates a memory reconfiguration to mitigate a memory rank collision according to one or more embodiments of the present disclosure;

Aspects of a memory rank 1114 are described with reference to FIG. 11. For example, when a partial memory region of a memory rank 1114 is used in an acceleration mode, a corresponding memory region may not be as a regular memory. Thus, the system may not process a regular read request or write request in the corresponding memory region. As shown in FIG. 11, a regular memory access 1191 (e.g., an OS-based access) to a memory region configured to operate in the accelerator mode may be denied. In some cases, a memory region within the same memory rank 1114 but outside the range used for acceleration mode may still be available for regular memory access.

In some cases, the regular memory access 1191 occurs in parallel with an execution of an acceleration logic, and the regular memory access 1191 may be processed earlier than an acceleration request due to a memory standard (e.g., the Joint Electron Device Engineering Council (JEDEC) standard). This is because the regular memory access 1191 has a higher priority than the acceleration request. As a result, a memory rank collision that results in a decrease in an acceleration speed may occur.

Referring to a memory device 1100 shown in FIG. 11, a partial memory region of a memory rank 1114, e.g., memory rank #3, may be configured to operate in the accelerator mode. As described above with reference to FIGS. 1 to 10, memory regions other than a memory region configured to operate in the accelerator mode in the memory rank 1114 of the memory device 1100 may be dynamically reconfigured to operate in the accelerator mode or a system memory mode. During an acceleration, a regular memory access (e.g., an OS-based access) to a memory region being used for the acceleration may be denied or restricted to prevent interference with the acceleration process.

In some examples, the regular memory access 1191 to a memory region used for an acceleration operation of a neural network may be denied. In some cases, another access 1192 to a memory region that is not used for acceleration may be allowed. The access 1192 to another memory region that does not intersect with a memory region used for an acceleration operation may be allowed. In some cases, since the acceleration operation and the regular memory access 1191 occur for the same memory rank 1114 as described above, speed of acceleration operations performed in parallel may be reduced due to access collision.

According to one or more embodiments of the present disclosure, the memory device 1100 may further include a collision counter 1115 that counts the above-described memory rank collisions. The collision counter 1115 may be disposed adjacent to a buffer chip 1113. The buffer chip 1113 may be a chip disposed for each memory rank 1114 in a memory buffer unit 1110 and may include, for example, an accelerator unit, a controller, and a buffer. A host processor or the memory device 1100 may also reconfigure a memory rank 1114 to be used exclusively for an accelerator, based on a collision ratio or a number of memory rank collisions collected through the collision counter 1115.

The collision ratio is a metric used to measure the frequency of memory rank collisions. For example, the collision ratio may be a ratio of a monitored number of collisions to a total number of accesses to a corresponding memory rank. A monitored number of collisions refers to the number of collisions that have occurred in a specific memory rank, as measured and recorded by the collision counter. An accelerator device driver may access a register of the collision counter 1115. The accelerator device driver may compare a threshold (e.g., a threshold number of collisions) to a monitored number of collisions. The accelerator device driver may report information associated with memory rank collisions to a reconfigurable memory manager. The reconfigurable memory manager may migrate data of a colliding memory region to another memory rank. A is described with reference to FIG. 12.

Figure 12:
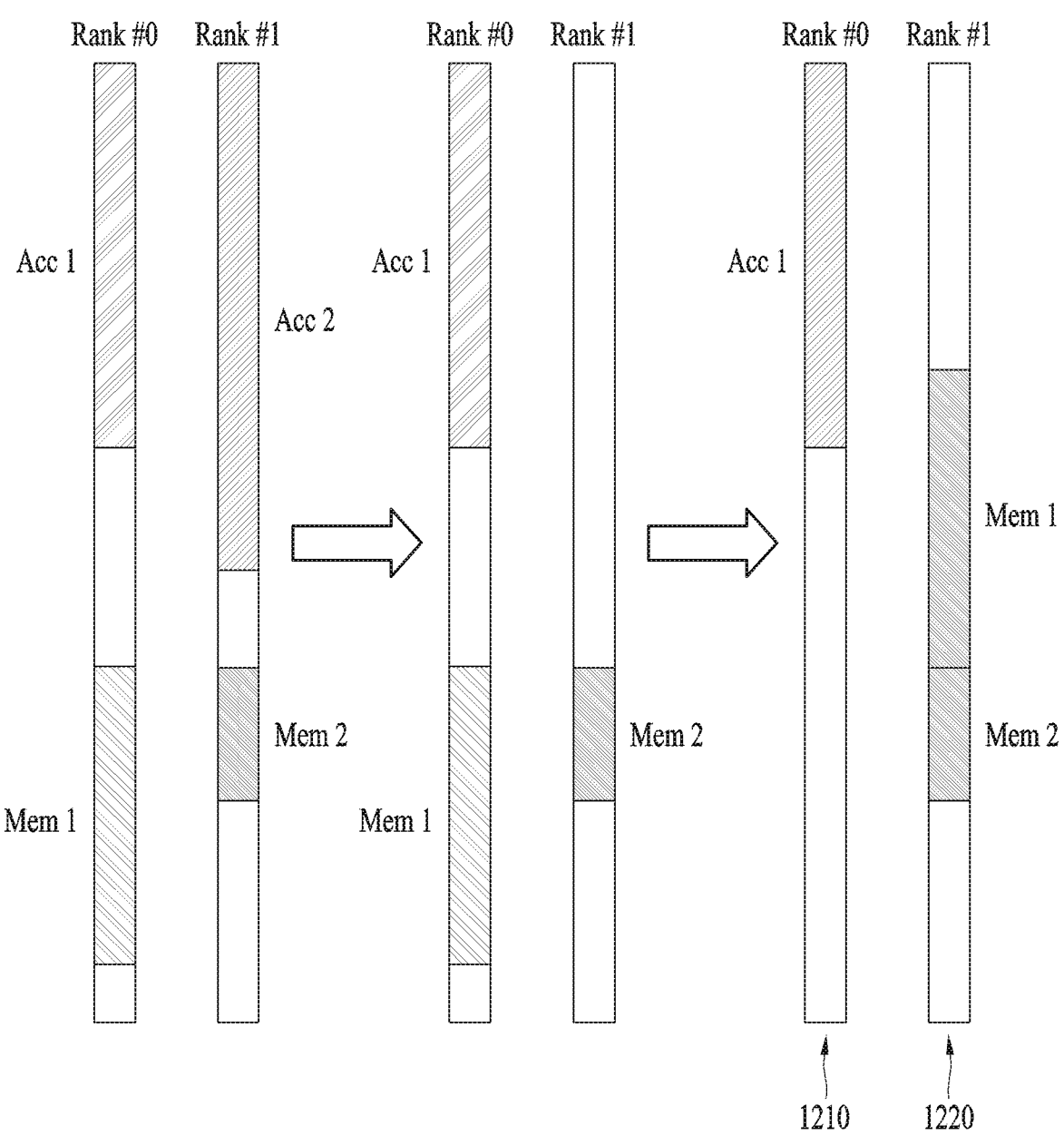
FIG. 12 illustrates an example of an operation of organizing data according to one or more embodiments of the present disclosure.

FIG. 12 illustrates an example of an operation of organizing data according to one or more embodiments of the present disclosure.

According to one or more embodiments of the present disclosure, when a memory rank 1210 includes a system memory region and a memory region for an acceleration logic, the host processor may migrate data of the system memory region to another memory rank 1220 based on where there is an available space in the other memory rank 1220. For example, when a memory rank collision due to access to the system memory region is detected at least a threshold number of times during execution of the acceleration logic using a memory region of the memory rank 1210, the host processor may monitor an available space for the other memory rank 1220.

When an available space is detected in the other memory rank 1220 during monitoring, the host processor may migrate the data of the system memory region to the detected available space. Accordingly, the host processor may configure the corresponding memory rank 1210 to be used exclusively for the execution of the acceleration logic. Here, if another acceleration logic is also being executed in the other memory rank 1220, the host processor may migrate data after waiting until the corresponding acceleration logic is completed, so as not to hinder the other acceleration logic.

Referring to FIG. 12, memory regions for a first acceleration logic Acc1 and a first system memory Mem1 may be configured in the memory rank 1210, that is, a rank #0, and memory regions for a second acceleration logic Acc2 and a second system memory Mem2 may be configured in the memory rank 1220, that is, a rank #1. When the second acceleration logic Acc2 of the memory rank #1 1220 is completed first, the host processor may migrate data of the first system memory Mem1 of the memory rank #0 1210 to the memory rank #1 1220, so that the memory rank #0 1210 may be operated exclusively for the accelerator.

Accordingly, memory rank collisions occurred in the accelerator mode and the system memory mode coexist in non-intersecting memory regions in memory ranks may be reduced. Non-intersecting memory regions may include regions within a memory rank that are exclusively allocated for use in the accelerator mode and memory regions in the memory rank that are exclusively allocated for use in the system memory mode.

For reference, an example of migrating data of a system RAM to prevent an occurrence of a memory rank collision has been described with reference to FIG. 12, however, embodiments of the present disclosure are not limited thereto. Depending on the design, reconfiguring of a memory region configured to operate in the accelerator mode and a data migration may be performed.

Figure 13:
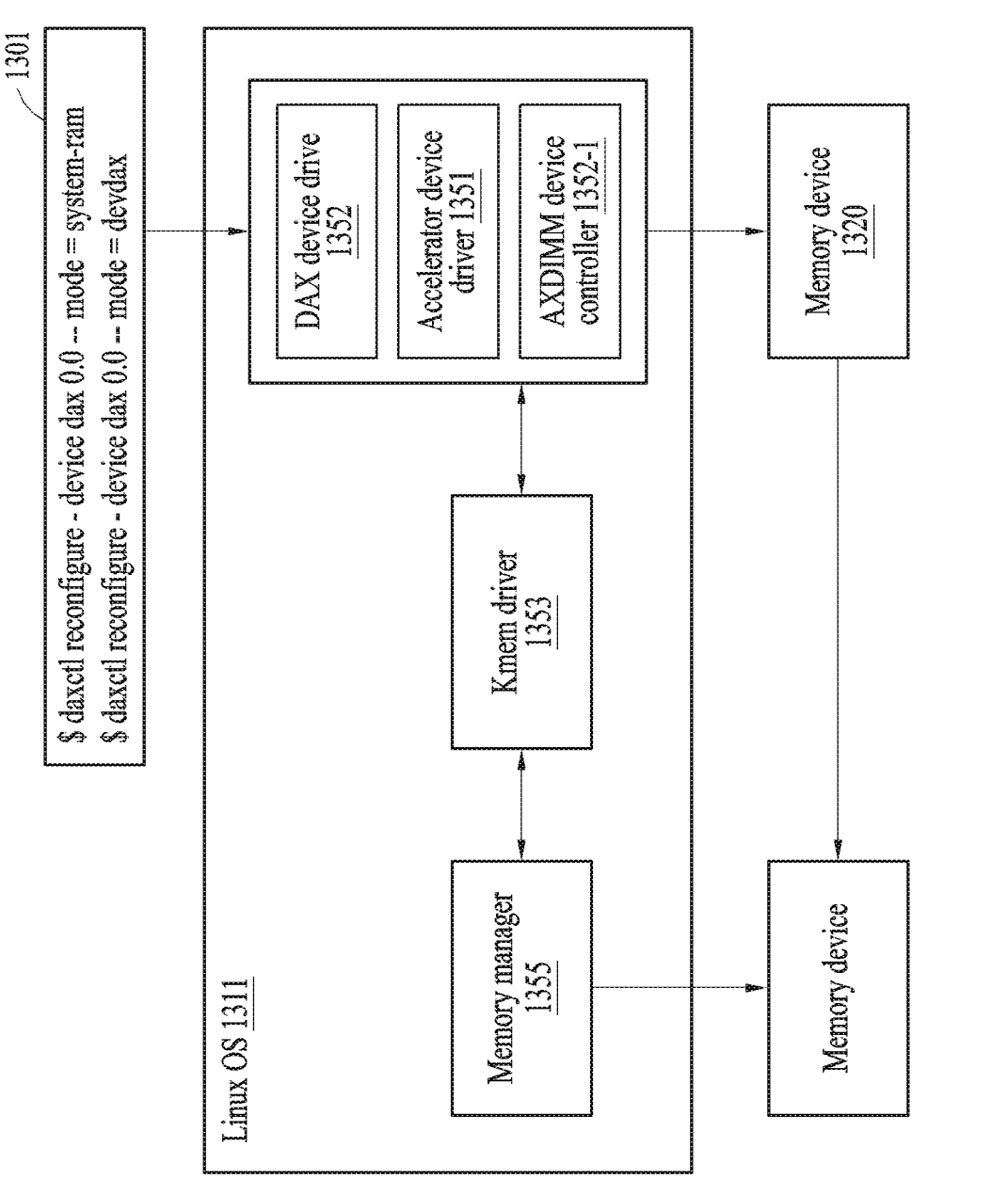
FIG. 13 illustrates an example of a Linux implementation of a dynamic reconfiguration of a memory according to one or more embodiments of the present disclosure.

FIG. 13 illustrates an example of a Linux implementation of a dynamic reconfiguration of a memory according to one or more embodiments of the present disclosure.

A memory device 1320 may include near-memory accelerator hardware, and may be implemented as, for example, AXDIMM hardware. An AXDIMM may switch a mode of a memory region between an accelerator mode and a system memory mode at a device level.

The AXDIMM hardware may be exposed as a DAX device by a BIOS to a Linux OS 1311. A DAX device may be managed by a DAX device driver 1352 extended with a component of an AXDIMM device controller 1352-1. An accelerator device driver 1351 described above with reference to FIGS. 6, 7, and 9 may perform interfacing between the AXDIMM device controller 1352-1 and the DAX device driver 1352. The above-described memory reconfigurator may be implemented as a Linux DAX kmem driver 1353 that provides a memory reconfiguration function. A memory manager 1355, for example, the above-described reconfigurable memory manager, may reconfigure a memory region of the memory device 1320 (e.g., an AXDIMM device) using a daxctl command line utility of a daxctl tool 1301 (e.g., $daxctl reconfigure-device dax 0.0--mode=system-ram and $daxctl reconfigure-device dax 0.0--mode=devdax).

For example, two main application programs describe execution of a GNU Compiler Collection (GCC) and a deep learning recommendation model (DLRM). A DLRM is a type of recommendation system that uses deep neural techniques and networks to learn to make recommendations. Deep learning is a subfield of machine learning and artificial intelligence that involves building and training neural networks with multiple layers to learn and extract features from large amounts of data. It is inspired by the structure and function of the human brain and has achieved remarkable success in areas such as image and speech recognition, natural language processing, and game playing. Deep learning neural network architecture includes convolutional neural networks (CNNs), recurrent neural networks (RNNs), generative adversarial networks (GANs), etc.

A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

A GAN is an ANN in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The generator's training objective is to increase an error rate of the discriminator by producing novel candidates that the discriminator classifies as "real" (e.g., belonging to the true data distribution). Therefore, given a training set, the GAN learns to generate new data with similar properties as the training set. For example, a GAN trained on photographs can generate new images that look authentic to a human observer. GANs may be used in conjunction with supervised learning, semi-supervised learning, unsupervised learning, and reinforcement learning.

The GCC may be a toolchain used to build software (e.g., Caffe2) for a DLRM. In a predetermined build step, a large amount of memory capacity may be consumed, and an additional AXDIMM memory capacity may be used to complete a task. The DLRM may obtain performance benefits from an SparseLengthSum (SLS) acceleration on an AXDIMM device.

In an example, the host processor may reconfigure the AXDIMM device as a system RAM using the daxctl tool 1301 for the Linux OS. The host processor may build Caffe2 with the GCC. The host processor may reconfigure the AXDIMM device as an accelerator using the daxctl tool 1301. The host processor may execute the DLRM with an acceleration in the memory device 1320.

According to one or more embodiments of the present disclosure, the host processor may recognize a memory device in the acceleration mode, in a process of executing a task for a simple SLS acceleration. The host processor may export a system memory to the OS by fully or partially reconfiguring the memory device. By exporting a system memory to the OS, the host processor makes the system memory accessible to the OS and available for the use of the OS. The host processor may perform a given task using the exported memory as a system memory. When the task is completed, the host processor may reconfigure the exported memory back to the accelerator mode. During the above-described operations, an electronic device may reconfigure memory regions without rebooting.

Figure 14:
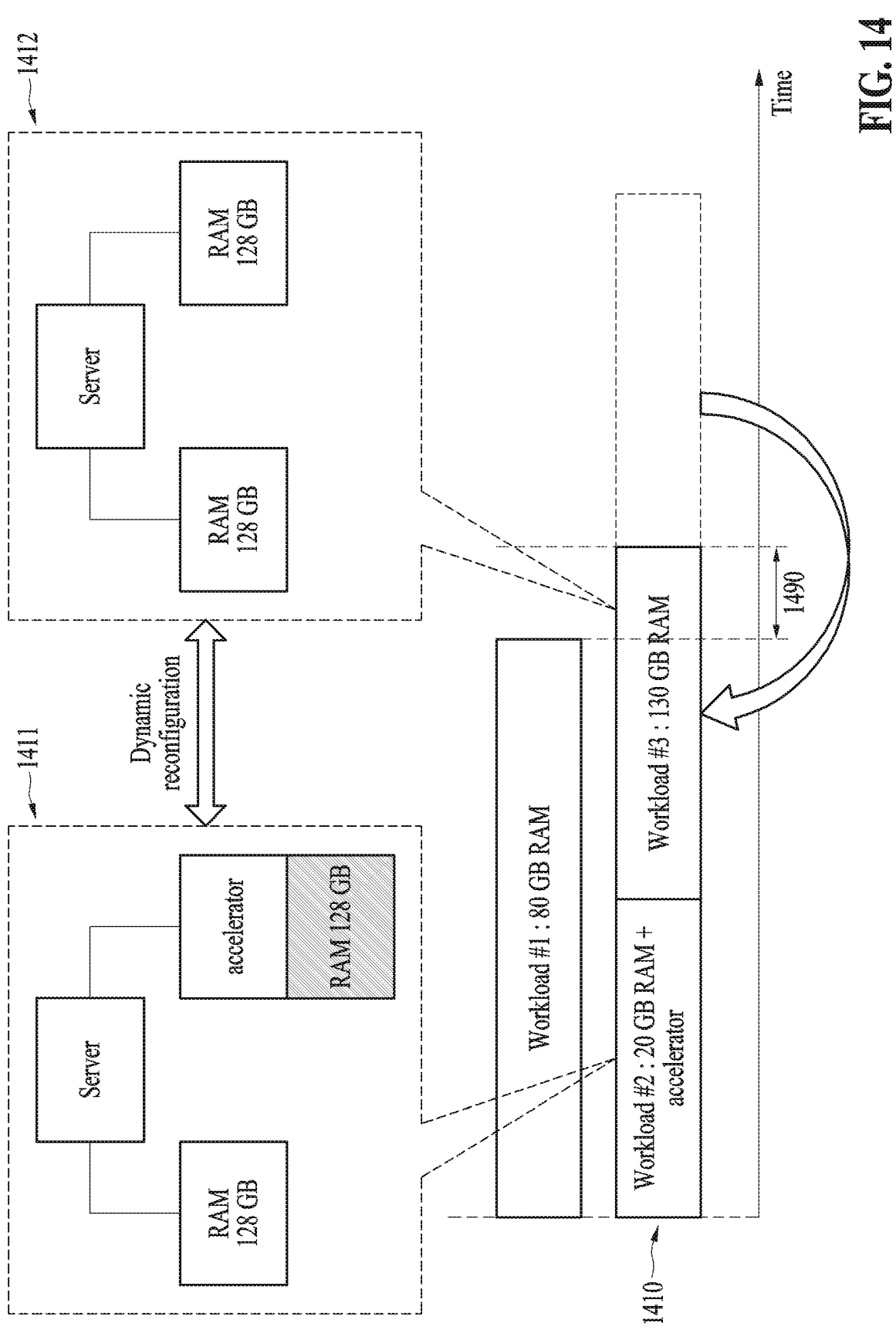
FIG. 14 illustrates a dynamic reconfiguration of a memory device according to one or more embodiments of the present disclosure.

FIG. 14 illustrates a dynamic reconfiguration of a memory device according to one or more embodiments of the present disclosure.

For example, a high-performance computing (HPC) cloud service that includes a near-memory acceleration feature may be provided by a vendor. The HPC cloud service may include an electronic device (e.g., a server) having a memory device with an accelerator unit described above with reference to FIGS. 1 through 13. A server may include a memory device with a capacity of 128 gigabytes (GB), and another memory device with a capacity of 128 GB. One or both of the memory devices may include a near-memory accelerator. In FIG. 14, the server may execute three workloads. Workload #1 may utilize a memory with a capacity of 80 GB. Workload #2 may utilize a memory with a capacity of 20 GB and an acceleration logic. Workload #3 may utilize a memory with a capacity of 130 GB. However, embodiments of the present disclosure are not limited thereto.

An electronic device according to one or more embodiments of the present disclosure may execute the workload #1 in a first memory device and execute the workload #2 in a second memory device 1410 in operation 1411. The electronic device may execute the workload #2 using the second memory device 1410 configured to operate in an accelerator mode. Since rebooting is not needed to be performed, the electronic device may reconfigure the second memory device 1410 even before the workload #1 is completed. When the workload #2 is completed in the second memory device 1410 independently of the first memory device, the electronic device may execute the workload #3 in operation 1412. Accordingly, the electronic device may reconfigure memory devices immediately as needed, instead of waiting for a reboot time 1490 and a waiting time until other workloads are completed. The electronic device may save a reboot time and execute workloads in parallel in individual memory devices and memory regions.

In some examples, the first memory device and second memory device are separate physical memory devices in the electronic device. For example, the first memory device and second memory device may have different configurations in terms of their memory capacity and whether they are configured for acceleration.

Figure 15:
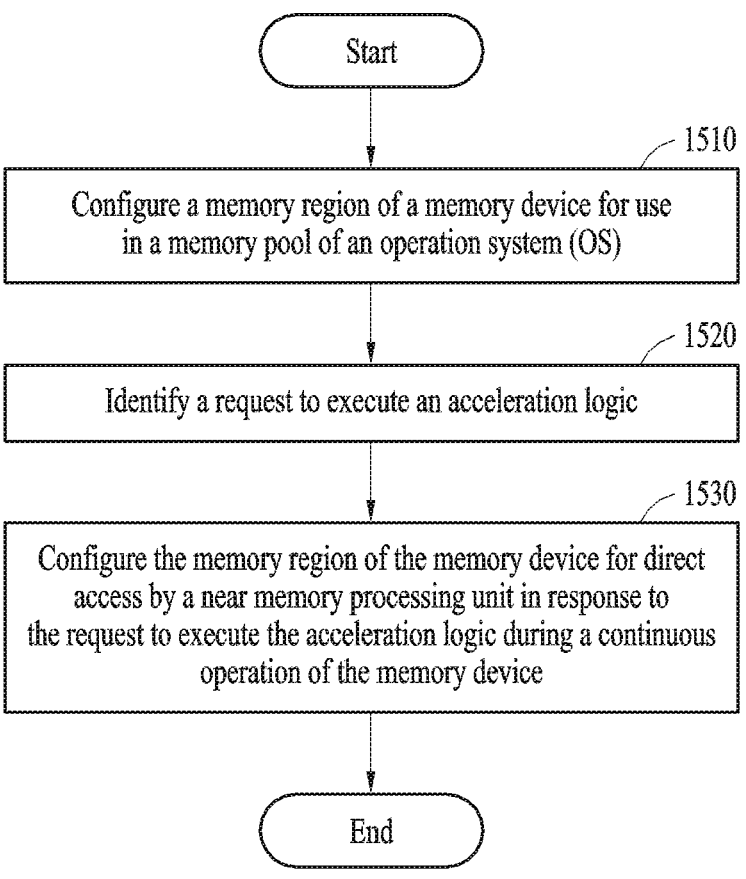
FIG. 15 is a flowchart illustrating a method of configuring a memory region of a memory device according to one or more embodiments of the present disclosure.

FIG. 15 is a flowchart illustrating a method of configuring a memory region of a memory device according to some embodiments of the present disclosure. In some examples, these operations are performed by a host processor. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1510, the system configures a memory region of a memory device for use in a memory pool of an operating system (OS). For example, The system may determine a portion of the memory device to be used by the OS as a memory pool that can be accessed by the operating system (OS).

At operation 1520, the system identifies a request to execute an acceleration logic. For example, an application or process running on the OS may require acceleration. The system identifies this request and triggers operation 1530.

At operation 1530, the system configures the memory region of the memory device for direct access by a near memory processing unit in response to the request to execute the acceleration logic during a continuous operation of the memory device. For example, the system may reconfigure the memory region of the memory device that was previously set aside for use in the memory pool of the OS to enable direct access by a near memory processing unit (e.g., an accelerator device) in response to the request for acceleration. This reconfiguration may be performed without interrupting the continuous operation of the memory device.

Figure 16:
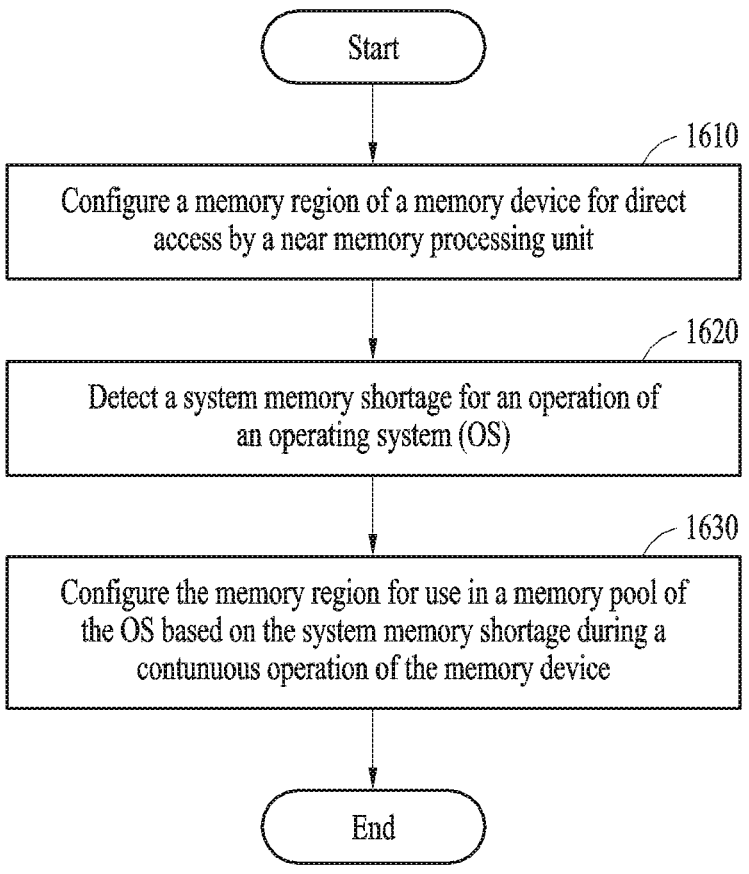
FIG. 16 is a flowchart illustrating a method of configuring a memory region of a memory device according to one or more embodiments of the present disclosure.

FIG. 16 is a flowchart illustrating a method of configuring a memory region of a memory device according to some embodiments of the present disclosure. In some examples, these operations are performed by a host processor. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1610, the system configures a memory region of a memory device for direct access by a near memory processing unit. For example, the system may configure the memory region so that the near memory processing unit can directly access data stored in a memory region without passing through a main data bus between a host processor and a memory chip (e.g., a memory rank). The near memory processing unit is configured to be located near a physical memory region to enable quick processing of data by bypassing the data bus between the host processor and the memory region.

At operation 1620, the system detects a system memory shortage for an operation of an OS. For example, the system may monitor the available system memory for the OS and detect when the system is experiencing a memory shortage. The system may then determine whether a memory region configured for direct access by a near memory processing unit can be allocated for use in the memory pool of the OS to address the memory shortage.

At operation 1630, the system configures the memory region for use in a memory pool of the OS based on the system memory shortage during a continuous operation of the memory device. For example, during the continuous operation of the memory device without rebooting.

The embodiments described herein may be implemented using a hardware component, a software component, or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an OS and one or more software applications that run on the OS. The processing device may also access, store, manipulate, process, and create data in response to execution of the software. For simplicity, the description of a processing device is singular; In some cases, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), RAM, flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order, or if components in a described system, architecture, device, or circuit are combined in a different manner, or replaced or supplemented by other components or their equivalents.

Therefore, other implementations, other embodiments, and equivalents to the claims are also within the scope of the following claims.

Structural or functional descriptions of embodiments of the present disclosure are provided herein as examples only and various alterations and modifications may be made to the embodiments. Accordingly, the embodiments of the present disclosure are not construed as limited to the present disclosure and should be understood to include all changes, equivalents, and replacements within the idea and the technical scope of the present disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and "includes/including" when used herein, specify the presence of stated features, integers, steps, operations, elements, or components, but do not preclude the presence or addition of one or more other features, integers, steps, operations, elements, components or groups thereof.

As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof.

Unless otherwise defined, all terms, including technical and scientific terms, used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art, and are not to be interpreted in an idealized or overly formal detect unless expressly so defined herein.

Hereinafter, the embodiments will be described in detail with reference to the accompanying drawings. When describing the embodiments with reference to the accompanying drawings, like reference numerals refer to like components and a repeated description related thereto may be omitted.

What is claimed is:

1. An electronic device comprising:
   a host processor comprising a memory controller connected to a memory device comprising a near memory processing unit,
   wherein the host processor is configured to:
      detect a system memory shortage for an operation of an operating system (OS);
      configure a memory region of the memory device for use in a memory pool of the OS in response to the system memory shortage;
      identify a request to execute an acceleration logic by the near memory processing unit; and
      configure the memory region of the memory device for direct access by the near memory processing unit in response to the request to execute the acceleration logic.

2. The electronic device of claim 1, wherein the host processor is further configured to:
   determine that a memory rank is unused for the acceleration logic in the memory device, wherein the memory region is located within the memory rank; and
   add the memory rank to the memory pool based on the determination.

3. The electronic device of claim 1, wherein the host processor is further configured to:
   determine that the memory region is allocated for the acceleration logic and is available for use as system memory;
   restrict access of the near memory processing unit to the memory region based on the determination; and
   add the memory region to the memory pool during a continuous operation of the electronic device.

4. The electronic device of claim 1, wherein the host processor is further configured to:
   determine that a system memory of the OS is insufficient by detecting an attempt by the OS to swap data of the memory pool of the OS, wherein the system memory shortage is based on the determination.

5. The electronic device of claim 1, wherein the host processor is configured to:
   determine that a memory rank in which the acceleration logic is executable is an unused memory rank, wherein the memory region is located within the unused memory rank; and
   cause the near memory processing unit to execute the acceleration logic using the memory region within the unused memory rank based on the determination.

6. The electronic device of claim 1, wherein the host processor is configured to:
   search for at least one candidate memory region from a memory rank used in the memory pool;
   identify the memory region from among the at least one candidate memory region; and
   cause the near memory processing unit to execute the acceleration logic using the memory region.

7. The electronic device of claim 6, wherein the host processor is configured to:
   exclude the memory region from the memory pool; and
   configure the memory region to restrict access of the OS to the memory region and allow direct access of the near memory processing unit to the memory region.

8. The electronic device of claim 6, wherein the host processor is configured to:
   lock the memory region;
   migrate data of the memory region to another memory region; and cause the acceleration logic to be executed using the memory region when migration of the data is completed.

9. The electronic device of claim 1, wherein the host processor is configured to:

determine that a memory rank comprises a system memory region and a memory region for the acceleration logic;

detect an available memory region in another memory rank; and migrate data of the system memory region to the other memory rank.

10. The electronic device of claim 9, wherein the host processor is configured to:

detect a memory rank collision between access to the system memory region by the OS and access to the memory region by the near memory processing unit during execution of the acceleration logic, the collision occurring a threshold number of times or greater; and monitor the available memory region based on the detected memory rank collision.

11. A method comprising:

configuring a memory region of a memory device for use in a memory pool of an operating system (OS);

identifying a request to execute an acceleration logic by a near memory processing unit of the memory device; and configuring the memory region of the memory device for direct access by the near memory processing unit in response to the request to execute the acceleration logic during a continuous operation of the memory device.

12. The method of claim 11, further comprising:

determining that a memory rank including the memory region is unused for the acceleration logic, wherein the memory region is configured for use in the memory pool based on the determination.

13. The method of claim 11, wherein configuring the memory region of the memory device for use in the memory pool further comprises:

determining that a memory rank being used for the acceleration logic is available;

configuring the memory region to restrict access of the near memory processing unit to the memory region based on the determination; and adding the first memory region to the memory pool without rebooting.

14. The method of claim 11, further comprising:

determining that a system memory of the OS is insufficient by detecting an attempt by the OS to swap data of the memory pool of the OS, wherein the memory region of the memory device for use in the memory pool based on the determination.

15. The method of claim 11, further comprising:

identifying a memory rank in which the acceleration logic is executable from among unused memory ranks; and causing the near memory processing unit to execute the acceleration logic using the memory region within the memory rank.

16. The method of claim 11, further comprising:

searching for at least one candidate memory region from a memory rank used in the memory pool;

identifying the memory region from within the at least one candidate memory region; and causing the near memory processing unit to execute the acceleration logic using the memory region.

17. The method of claim 16, further comprising:

excluding the memory region from the memory pool; and configuring the memory region to restrict access of the OS to the memory region and to allow direct access of the near memory processing unit to the memory region.

18. The method of claim 16, further comprising:

locking the memory region; and migrating data of the memory region to another memory region, wherein the near memory processing unit is caused to execute the acceleration logic after migrating the data.

19. The method of claim 11, further comprising:

determining that a memory rank comprises a system memory region and a memory region for the acceleration logic;

detecting an available space in another memory rank; and migrating data of the system memory region to the other memory rank.

20. A non-transitory computer-readable storage medium storing instructions that, when executed by a processor, cause the processor to perform the method of claim 11.

21. A method comprising:

configuring a memory region of a memory device for direct access by a near memory processing unit;

detecting a system memory shortage for an operation of an operating system (OS); and configuring the memory region for use in a memory pool of the OS based on the system memory shortage during a continuous operation of the memory device without rebooting.

22. The method of claim 21, further comprising:

identifying a request to execute an acceleration logic, wherein the memory region is configured for direct access by the near memory processing unit based on the request to execute the acceleration logic.

\* \* \* \* \*